(12) United States Patent
Blake et al.

(10) Patent No.: US 11,898,498 B2
(45) Date of Patent: Feb. 13, 2024

(54) METHOD AND SYSTEM FOR REDUCING CROSS-SHAFT VIBRATIONS

(71) Applicants: Rolls-Royce Deutschland Ltd & Co KG, Blankenfelde-Mahlow (DE); Rolls-Royce plc, London (GB)

(72) Inventors: Greg Blake, Berlin (DE); Lucia Ciciriello, Berlin (DE); Mark Spruce, Derby (GB); Matthew Wilson, Belper (GB)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 143 days.

(21) Appl. No.: 17/603,218

(22) PCT Filed: Apr. 27, 2020

(86) PCT No.: PCT/EP2020/061643
§ 371 (c)(1),
(2) Date: Oct. 12, 2021

(87) PCT Pub. No.: WO2020/221700
PCT Pub. Date: Nov. 5, 2020

(65) Prior Publication Data
US 2022/0186670 A1 Jun. 16, 2022

(30) Foreign Application Priority Data

Apr. 30, 2019 (EP) .................................. 19172018
Nov. 19, 2019 (EP) .................................. 19210094

(51) Int. Cl.
*F02C 7/36* (2006.01)
*F02C 7/06* (2006.01)
*F02C 9/00* (2006.01)

(52) U.S. Cl.
CPC .................. *F02C 7/36* (2013.01); *F02C 7/06* (2013.01); *F02C 9/00* (2013.01);
(Continued)

(58) Field of Classification Search
CPC ...... F02C 7/36; F02C 7/06; F02C 9/00; F02C 3/107; F02C 9/56; F05D 2260/40311;
(Continued)

(56) References Cited

U.S. PATENT DOCUMENTS

| 4,776,216 A | 10/1988 | Barton et al. |
| 8,459,038 B1 | 6/2013 | Lickford et al. |

(Continued)

FOREIGN PATENT DOCUMENTS

| CN | 105782428 A | 7/2016 |
| DE | 102017114087 A1 | 1/2018 |

(Continued)

OTHER PUBLICATIONS

International Search Report and Written Opinion dated Oct. 16, 2020 from counterpart International Patent Application No. PCT/EP2020/061643.

(Continued)

*Primary Examiner* — Yi-Kai Wang
(74) *Attorney, Agent, or Firm* — SHUTTLEWORTH & INGERSOLL, PLC; Timothy J. Klima

(57) ABSTRACT

Embodiments of the invention are shown in the figures, where a method for manufacturing a gearbox, the method comprising: providing a predefined interval around an integer; providing a gearbox setup; determining a speed ratio of at least two components of the gearbox setup; comparing the speed ratio with the predefined interval around the integer; and manufacturing a gearbox in accordance with the gearbox setup in dependence on the comparison.

16 Claims, 15 Drawing Sheets

(52) U.S. Cl.
CPC ...... *F05D 2260/40311* (2013.01); *F05D 2260/96* (2013.01); *F05D 2270/02* (2013.01); *F05D 2270/304* (2013.01); *F05D 2270/334* (2013.01)

(58) Field of Classification Search
CPC ............. F05D 2260/96; F05D 2270/02; F05D 2270/304; F05D 2270/334; F16F 15/0235; F16F 15/002; B60Y 2300/20; B60Y 2304/09; F16H 57/023; F16H 57/028; F16H 57/01; F16H 1/28
USPC ...................................................... 415/122.1
See application file for complete search history.

(56) References Cited

U.S. PATENT DOCUMENTS

| | | |
|---|---|---|
| 8,881,583 B2 | 11/2014 | Sakaguchi |
| 9,004,246 B2 | 4/2015 | Sloth |
| 2005/0284225 A1 | 12/2005 | Luo |
| 2008/0276620 A1 | 11/2008 | Ullyott et al. |
| 2009/0110541 A1 | 4/2009 | Southwick et al. |
| 2010/0167867 A1* | 7/2010 | Sugitani ............... F16H 1/46 475/339 |
| 2014/0148302 A1* | 5/2014 | Gieb .................... F16H 1/28 475/334 |
| 2016/0376911 A1* | 12/2016 | Sheridan ............... F01D 15/12 415/124.1 |
| 2018/0050809 A1 | 2/2018 | Colvincenzo et al. |
| 2019/0078975 A1* | 3/2019 | Sibbach ............... G01M 13/028 |

FOREIGN PATENT DOCUMENTS

| | | |
|---|---|---|
| JP | 2007054896 A | 3/2007 |
| WO | 2019001372 A1 | 1/2019 |

OTHER PUBLICATIONS

European Search Report dated Aug. 25, 2020 from counterpart European Patent Application No. 19210094.9.
European Search Report dated Nov. 18, 2019 from counterpart European Patent Application No. 191720018.4.

* cited by examiner

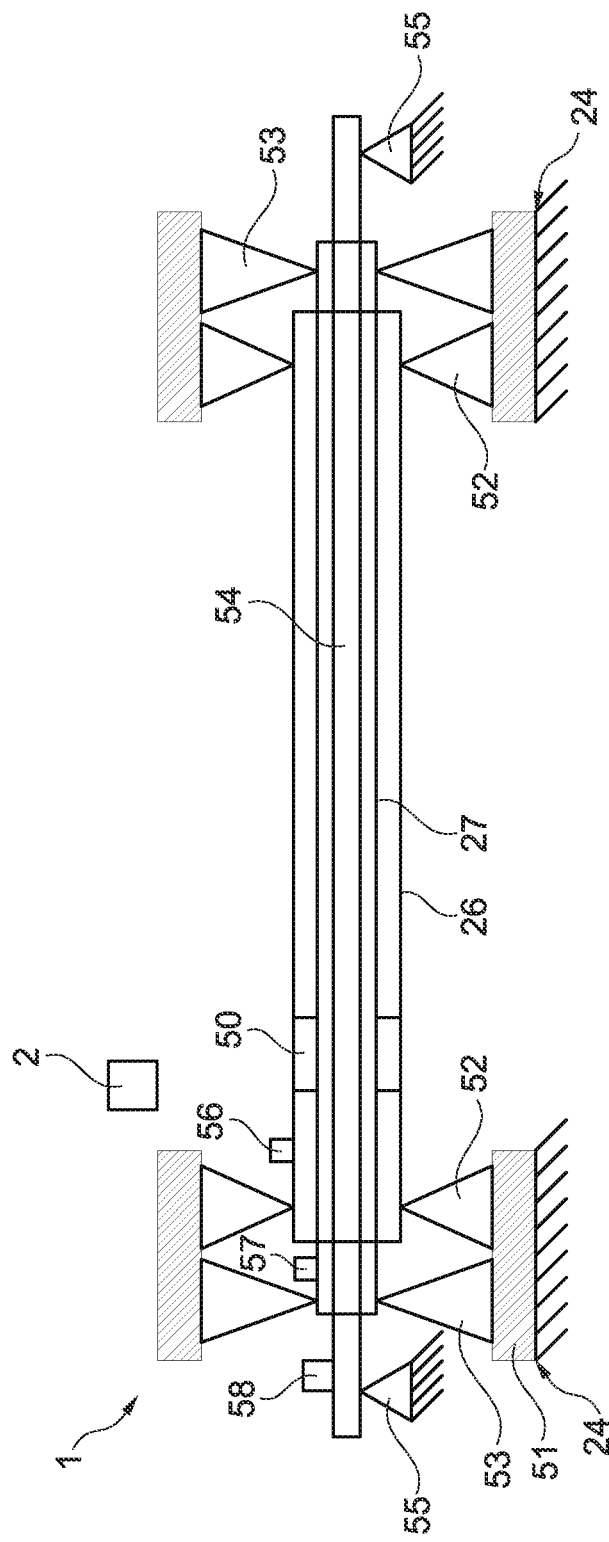

METHOD AND SYSTEM FOR REDUCING CROSS-SHAFT VIBRATIONS

This application is the National Phase of International Application PCT/EP2020/061643 filed Apr. 27, 2020 which designated the U.S.

This application claims priority to European Patent Application Nos. EP19172018.4 filed Apr. 30, 2019 and EP19210094.9 filed Nov. 19, 2019, which applications are incorporated by reference herein.

BACKGROUND

The present disclosure relates to a method for manufacturing a gearbox, a gearbox, a method for controlling a gas turbine engine and a gas turbine engine.

A common problem in the field of rotating machinery is controlling the level of vibration. Vibration may be caused by imbalances of a shaft and supported rotatable elements, such as, e.g., compressor and turbine discs and blades in gas turbine engines, and also external forcing such as, e.g., aircraft maneuvers and aerodynamic forces in the aircraft. Damping systems such as fluid dampers are commonly employed to reduce vibrations.

Further, gearboxes are prone to vibrations, in particular when one or more rotatable components of the gearbox have imbalances. Conventional gearboxes which operate with a discrete number of teeth, usually inherently create vibration during operation due to stiffness variations over the phase cycle of the gear tooth contact. The results of this effect may be referred to as gearbox internal forcing. The majority of forces acting on the engine that are able to generate vibration by exciting a response in resonance or a more generic transient vibrational response may be referred to as external forces.

Vibrations are specifically pronounced at particular rotational speeds and/or frequencies, known as "critical" speeds, in view of resonances of the rotating system, e.g., a gearbox. It is known that in multi-shaft engines critical cross shaft resonances exist, where a cross shaft resonance is a condition where excitation generated by one or more shafts are able to excite natural frequencies that generate vibration on the other shaft. It is worth noting that the common damping arrangements located at the bearing can be ineffective to reduce cross shaft vibrations. It is worth noting that cross-shaft vibrations may be particularly high when a power gearbox is introduced in an engine driveline to transmit a high fraction of the engine power, such as in geared turbofan architectures.

At the critical speeds systems commonly vibrate in resonance, a condition at which vibrations are sustained by the system internal vibratory response determined by the designed stiffness to inertia ratios and rotating and non-rotating damping. The damping system is commonly designed such that its capabilities are not exceeded in use. In many cases the damping system and other components, such as a supporting structure, correspondingly have a relatively high weight. In many fields however, for example, aerospace, weight is an important consideration. It is worth noting that the addition of damping elements may reduce vibration within nominal damper design conditions, but can, in fact, end up increasing vibration in operational points outside from the nominal damper design conditions.

It is worth noting that damping systems typically only reduce the effects of vibrations, in particular resonances, without eliminating the cause. It should also be noted that at certain unbalances gearbox internal and external forcing levels, vibration frequencies are determined and influenced by the stiffness to inertia distribution of the whole arrangement which is generally difficult to modify in a manner to reduce vibration throughout a flight envelope (or more in general, throughout the rotor system operational ranges).

SUMMARY

It is an object to reduce vibrations in rotating machinery, in particular to a level where the life and integrity of the machine are not affected.

According to an aspect there is provided a method for manufacturing a gearbox, the method comprising: providing a predefined interval I around an integer Ri, the predefined integer Ri being e.g. larger than 1; providing a gearbox setup, e.g. with a predefined transmission ratio or with a transmission ratio within a predefined range around the predefined transmission ratio; determining a speed ratio R of at least two components of the gearbox setup (Including relevant speeds in the gearbox bearing systems); comparing the speed ratio R with the predefined interval I around the integer Ri; and manufacturing the gearbox in accordance with the gearbox setup and in dependence on the comparison of the speed ratio R with the predefined interval I around the integer Ri.

Besides the gearbox components including gearbox bearings, the avoidance of integer speed ratios by design and related benefits in terms of structural integrity may also be applied to other engine rolling bearings, with or without squeeze film, both conventional or inter-shaft bearings.

This is based on the finding that the ratio of the speeds of two rotating components of gearboxes is an important factor in the creation of vibrations in the gearbox, and that this can be addressed when designing and manufacturing a gearbox with a desired transmission ratio (particularly larger than 1, e.g. between 3 and 4). When, for example, asymmetries due to an imperfect manufacturing of the gearbox components or due to wear are present, and the components rotate at high speeds, an asymmetric portion of one component may face the same portion of another component in a periodic manner. This may, in turn, create increased vibrations and considerably augment the wear of rotors and stators, particularly when resonances of the gearbox or adjacent parts are met. By avoiding integer speed ratios and maintaining predefined minimum distances to integer speed ratios, gearboxes can be manufactured that do not exhibit various resonances, and hence are much less prone to vibrations by design. This may strongly increase the lifetime and the maintenance intervals for the gearbox and limit detrimental interactions with the engine controllers that can generate safety critical conditions.

According to an embodiment, the interval I around the integer Ri is defined as follows:

$$(\sqrt[2]{(Ri^2 - k)}, \sqrt[2]{(Ri^2 + k)}).$$

Therein, k is an integer. When comparing the speed ratio R with the interval I, it is determined whether or not the speed ratio R is between the limits of the interval, e.g., $$\sqrt[2]{(Ri^2 - k)} \text{ and } \sqrt[2]{(Ri^2 + k)}.$$

By determining that the speed ratio R is within the interval I, it may be assessed that this particular gearbox setup is prone for vibrations. Moreover, the method provides for the identification of residual critical vibration frequencies and harmonics so that they can be monitored, used to calculate the fatigue life consumption and eliminate unwanted detrimental interactions with engine controllers. Residual vibration frequencies indicating vibration induced by periodicities that cannot be eliminated may be accounted in order to ensure a high level of structural integrity, e.g., by actuating maintenance protocols based on life consumption calculations. By using $$\sqrt[2]{(Ri^2 - k)} \text{ and } \sqrt[2]{(Ri^2 + k)}$$

as the limits of the interval, it is possible to effectively ensure that the speed ratio is sufficiently far away from an integer number, and that it can be as close as practicably possible to an irrational number also in proximity of the limits of the interval. By this it is possible to define precise intervals of criticality around integer speed ratios using a particular series of irrational numbers.

Irrational numbers allow strong reductions in the level of vibrations.

It is noteworthy that irrational numbers are ideal candidates for speed ratios, as they can ensure a minimal level of vibrations. However, despite that a conventional toothed gearbox is incapable of generating an irrational speed ratio, the use of such irrational numbers for the speed ratio limits is justified.

For example, the variable k is 1 or larger, and, optionally, smaller than Ri. Specifically, the variable k may be 1. This can define the closest usable series of irrational numbers next to the integer. This provides a large allowable band of speed ratios while the interval I defined above is a restricted band. The definition of the value for the variable k (e.g., 1, 2, 3, . . . ) may be determined upon the magnitude of the speed ratio (e.g., k=2 or higher may be used for a speed ratio R>5) and/or design boundaries that are in turn determined by optimizations of power, number of planets, stress limitations, operating speed, weight and dimensions and/or manufacturing quality.

According to an example, one of the at least two components of the gearbox setup is rotatable with respect to a fixture at a first speed and the other one of the at least two components is rotatable with respect to the fixture at a second speed, wherein the speed ratio of the two components is the ratio of the first and the second speeds. For the ratio, the larger speed may be divided by the smaller speed.

Comparing the speed ratio with the predefined interval around the integer may comprise determining whether or not the speed ratio is within the predefined interval around the integer. Manufacturing the gearbox in accordance with the gearbox setup and in dependence on the comparison may then comprise manufacturing the gearbox in accordance with the gearbox setup only when the speed ratio is not within the predefined interval (the restricted band) around the integer. In the speed ratio is found to be inside the predefined interval, the method may return to the step of providing a gearbox setup, different from the gearbox setup(s) provided before. It is worth noting that once the transmission ratio is defined, the other speed ratios in the gearbox fall in proximity of different integer numbers.

Optionally, a speed ratio is determined for a plurality of pairs of two components of the gearbox setup, in particular for each of plurality of pairs of two components of the gearbox setup. Therein, e.g., all components that are rotatable with respect to a common fixed part may be taken account of. By making sure that there exists no pair of rotatable components having a speed ratio within the disallowed interval, vibrations may be strongly reduced. Is it worth to add already at this stage that when this condition is not possible for all speed ratios, then for those ratios falling in the disallowed range, the calculation of the residual vibration frequencies will allow monitoring, life consumption calculation, and decoupling between the critical frequency and engine active controllers. It will be appreciated that the calculation of the residual frequencies, as well as the consequent life consumption calculations and/or maintenance protocols may be applied also for the speed ratios and gearbox designs that fall within the allowed ranges.

The components of the gearbox setup may comprise one or more gears. One or more of the gears, in particular all of the gears may have a number of teeth that is a prime number. Alternatively or in addition, the tooth numbers of one pair (or all pairs of rotatable gears, or all meshing gear pairs of the gearbox) may be coprime. One or more pairs, in particular all possible pairs of rotatable components of the gearbox (that have teeth) may have only one common factor in their numbers of teeth. It has been found that gear tooth numbers that are coprime may lead to very low vibrations and thus to a long lifetime of the gearbox. In comparison it has been found that a gearbox having components with ten common factors may even have an expected lifetime reduced by as much as 90%.

The components of the gearbox setup may further comprise a carrier for one or more gears, a roller-bearing cage and/or an oil film of a bearing. The oil film may rotate at a certain speed in use of the gearbox and this speed may have a speed ratio with another component, e.g., a gear, that may potentially be within an interval around an integer. By taking the oil film (and/or said carrier and/or cage) into account, further sources for vibrations may be excluded. The cage speed in rolling bearings and the average oil film velocity are both parameters that may be determined by other variables than the number of teeth. This fact provides further degrees of freedom that the designer can use for the avoidance of the restricted band.

While generally the design and manufacturing of the gearbox as described above is applicable to all kinds of transmissions, according to a specific example, the gearbox is a planetary gearbox, and most specifically, of a gas turbine engine. Such gearboxes are typically driven at high speeds and at high power densities, so that each reduction in the level of vibrations may be particularly beneficial.

According to an embodiment of the method a plurality of different gearbox setups with the predefined transmission ratio or with a transmission ratio within the predefined range around the predefined transmission ratio are provided. The different setups may comprise the same types of gears, but with different numbers of teeth. For example, the topology is the same among the gearbox setups, but at least one gear at the same position in the topology has a different number of teeth between the different gearbox setups. Further, for each of the plurality of gearbox setups a speed ratio of at least two rotatable components of the respective gearbox setups may be determined, in particular of every possible pair of rotating components. The determined speed ratios may then be compared with the predefined interval around the integer. After that, one of the pluralities of gearbox setups may be selected for manufacturing the gearbox, wherein the section is based on the comparison of the determined speed ratios with the predefined interval around the integer.

The different gearbox setups may differ in the number of teeth of at least one (corresponding) component, e.g., a sun gear, a planet gear and/or a ring gear, when the gearbox is a planetary gearbox. The method is applicable to all gearbox architectures; formulas and design constraints that define speed ratios may change, but the interval definition will apply in the same manner.

According to an aspect, a system and a method for monitoring a gearbox (in particular manufactured in accordance with the method described herein) are provided. The method may comprise (and the system may be adapted to) determining one or more components of the gearbox having the speed ratio closest to an integer, and monitoring the residual vibration of the determined component(s), e.g., more precisely than other components. Alternatively or in addition the method comprises determining at least one hunting tooth frequency of a pair of components of the gearbox.

According to an aspect, a system and a method are provided for calculation of an expected lifetime of a gearbox based on periodicities encountered in a flight mission.

According to an aspect there is provided a system and a method for controlling an apparatus based on (i) identifying one or more speed ratios of components of a gearbox within an interval around the integer defined as $$(\sqrt[2]{(Ri^2 - k)}, \sqrt[2]{(Ri^2 + k)}),$$

wherein k is an integer, and (ii) calculating residual vibrations (in particular their frequencies) based on the identified speed ratios.

Sidebands are distinct frequencies on either side of a primary frequency. Sidebands can be the result of amplitude or frequency modulation. A sideband can be used to diagnose problems with rotating machinery. It should be noted that epicyclic gearboxes (including planetary) can create apparent sidebands from the fact that the frequency of rotating forces depends on the reference frame of the observer—generally static in the engine frame. Just as an example, once (particularly low frequency) vibrations due to sidebands that are generated by the gearbox running in the restricted ranges are known, a notch filter can be applied in control loops of the control system and/or method to exclude the corresponding frequencies from being (unwillingly) excited by the controllers. It is worth noting that frequencies lower than 20 Hz are usually very prone to be excited by the controller. The mechanism that generates the control system interactions can be summarised as follows: (i) The vibrations are generated by rotors harmonics and sidebands (sum and difference of existing frequencies that generate modulations); (ii) These vibrations are captured by sensors on which an engine active control loop is closed (e.g., fuel intake, vane variable geometry position etc.); (iii) The controller minimizes an error between the sensor signal and a demand and generates variations in the engine controlled regulations at the mentioned frequencies; (iv) Potentially high magnitude driving forces are generated into the engine apparatus, provoking resonance excitation; and (v) When the speed ratios become closer to integer, the low frequency modulations (e.g., sidebands having a frequency given by the difference (fi−fj) of the two interacting force frequencies) may become higher in magnitude whilst their frequency decreases. Consequently, low frequency modulations may become most prone to be magnified by the engine active controllers with the effect to induce detrimental control loop instability in proximity of integer speed ratios.

According to an aspect, a gearbox is provided. The gearbox may be manufactured in accordance with the method of any embodiment described herein. The gearbox comprises a plurality of components. One or more pairs, in particular each pair of the plurality of components is rotatable with respect to a fixed part of the gearbox at a speed ratio R that may fulfil the following requirement:

$$\sqrt[2]{(Ri^2 + k)} < R < \sqrt[2]{((Ri+1)^2 - k)}.$$

Therein, Ri may be an integer larger than 1 and/or k is an integer of at least 1, e.g., 1. Such a gearbox may be operable with particularly low level of vibration.

According to an aspect there is provided a method for controlling an apparatus (in particular, of a gas turbine engine) having at least a first shaft and a second shaft (e.g., rotatable with a variable ratio of speeds). The method comprises controlling rotation of at least one of the shafts depending on a speed ratio of speeds (e.g., of the shafts). The apparatus may be, e.g., a gearbox, e.g. with a variable transmission, or another part of a gas turbine engine, wherein each of the shafts is driven by a turbine and drives a compressor and/or fan.

In particular, controlling rotation of the at least one of the shafts depending on the speed ratio (the speed of one of the shafts divided by the speed of another one of the shafts, wherein, e.g., the larger speed value is divided by the smaller speed value) may be performed so as to avoid integer ratios (or substantially integer ratios) of speeds of the shafts. The one or more shafts may be controlled to rotate only at speeds that do not lead to a predetermined speed ratio value, in particular an integer speed ratio. In other words, it may be avoided that one shaft rotates at a speed that is a multiple of the speed of another shaft. It has been found that integer speed ratios of two shafts of an apparatus may lead to strongly increased vibrations by cross-excitation, i.e., by driving vibrations from one shaft to one or more of the other shafts. Two shafts rotating at integer speed ratios are particularly able to generate periodic excitations that are in phase. This may excite and maintain vibrating cross-shaft resonances. By avoiding such integer speed ratios it is thus possible to strongly reduce vibrations in or of the apparatus. This can be particularly beneficial because in practice it is often difficult or impossible to model cross-shaft resonances. Other speed ratios that in a given apparatus also lead to specifically strong vibrations may be determined by simulations and/or measurements and avoided alternatively or in addition to integer (or substantially integer) ratios. Optionally, the apparatus comprises three or more shafts and the method comprises avoiding any conditions at which two pairings of the three or more shafts rotate at integer speed ratios.

Optionally, controlling rotation of the at least one of the shafts depending on the speed ratio is performed so as to avoid speed ratios within a predefined interval around an integer. The interval may be defined as $$(\sqrt[2]{(Ri^2 - k)}, \sqrt[2]{(Ri^2 + k)}),$$

wherein k is an integer. That is, the same underlying mechanism for reducing vibrations discussed with respect to gearboxes above may also be applied to shafts that may rotate at variable speeds.

This is further based on the finding that specific speed ratios may lead to stronger cross-shaft vibration excitations than other speed ratios. By controlling the rotation of one or more shafts of the apparatus taking into account the speed ratio, it is possible to strongly reduce vibrations. As a result, wear of the shafts and other components may be mitigated, so that in turn their weight may be reduced and their lifetime increased. Further, also damping may be constructed lighter.

The apparatus may be a rotating machinery, in particular a gas turbine or an engine, e.g. a gas turbine engine, or a part thereof. The shafts may transmit torque. For example, each of the shafts drives a component of the apparatus. The rotation of the shafts is defined, e.g., with respect to a stationary support structure with respect to which each of the shafts is rotatable.

Controlling rotation of the at least one of the shafts depending on the speed ratio may comprise restricting the rotation of the shafts to predetermined speed ratios. Other speed ratios, in particular speed ratios that lead to stronger cross-shaft vibrations, are excluded.

The method may further comprise determining, e.g., measuring, a speed of the first shaft and/or a speed of the second shaft (and/or, optionally, the speed of a third shaft or additional shafts). By this, the current shaft speeds may be taken into account.

The method may further comprise calculating a speed ratio of the determined speeds of the first and second shafts. Controlling rotation of the at least one of the shafts may be performed depending on the calculated speed ratio (of the speeds the shafts are currently rotating).

The method may further comprise determining whether or not the calculated speed ratio is within a predetermined distance to and/or interval around an integer. In this case an adjustment of a control parameter may be triggered.

Controlling rotation of the at least one of the shafts may comprise controlling the at least one of the shafts so as to increase or decrease its speed, e.g., when the speed ratio is within the predetermined distance to or interval around a predetermined value, in particular an integer. The increase of vibrations may particularly be present in a given interval around integer numbers of the speed ratios.

Controlling the at least one of the shafts so as to increase or decrease its speed may be performed by moving a variable device of the apparatus. The variable device may be adapted to control a flow of a fluid.

Optionally, the apparatus is a gas turbine (in particular a gas turbine engine). The variable device may comprise at least one variable stator vane and/or at least one variable inlet guide vane, in particular of a compressor. By this the speed of the corresponding shaft may be increased or decreased, e.g. to avoid an integer value.

Optionally, the apparatus is an engine. Controlling rotation of at least one of the shafts may comprise incrementing or decrementing a power setting of the engine. By this, the speed ratio may be adjusted so as to avoid an integer value. Controlling rotation may be effected by changing a fuel flow to effect an increase or decrease in power.

The method may further comprise determining a level of vibrations at the apparatus. The level of vibrations may then be compared with a predetermined threshold. Controlling rotation of the at least one of the shafts depending on the speed ratio of the speeds of the shafts can then be performed (in particular triggered) when (e.g., only when) the level of vibrations exceeds the predetermined threshold. By this it is possible to reduce interventions, e.g. in cases where a relative level of vibrations is increased (e.g. at a peak value), but at a low absolute value. Tolerable vibrations may thus be allowed. Alternatively or in addition, integer shaft speed ratios may be tolerated (e.g. do not trigger an adjustment of a control parameter) when one or more shafts rotate at a predetermined range of speeds, e.g. speeds that were proven to not be prone to strong vibrations.

Optionally, a database may be provided, the database storing a plurality of possible operational statuses of the apparatus and (appropriate) speeds, in particular speed set points, of the shafts for each operational status (in particular having no integer ratio). The method may further comprise controlling the apparatus using the database. Alternatively or in addition to a calculation of current speed ratios of measured shaft speeds the database may initially and/or adaptively be created so that for each operational status (e.g., different power settings) one or more sets of speeds of the shafts are stored which avoid large-vibration speed ratios, in particular integer speed ratios. The database is then created depending on one or more speed ratios of speeds of the shafts, and one or more shafts of the apparatus are controlled using the database (and thus also depending on one or more shaft speed ratios). The speeds in the database may be optimized for a fuel efficiency.

Optionally, the database comprises at least one series of possible successive operational statuses and appropriate speeds of the shafts for each operational status, in particular having no integer ratio. In the example of a gas turbine engine, a series of operational statuses may be a flight profile or a part thereof. By this, crossing of integer speed ratios may be systematically avoided.

According to an aspect, a control system for controlling an apparatus having at least a first and a second shaft that are rotatable with a variable ratio of speeds is provided. The control system is adapted to perform the method for controlling the apparatus according to any aspect or embodiment described herein.

The control system may further comprise a near-integer-speed-ratio detector for detecting a ratio of speeds at, near to (e.g. inside a predetermined interval around, in particular the interval I defined above) and/or approaching (e.g. entering a predetermined interval around) an integer value.

Optionally the control system further comprises a database storing a plurality of possible operational statuses of the apparatus and (appropriate) speeds of the shafts for each operational status, in particular having no substantially integer ratio.

According to an aspect, an apparatus is provided. The apparatus comprises at least two shafts and the control system according to any aspect or embodiment described herein. The apparatus may be or comprise a gas turbine, in particular a gas turbine engine, particularly for an aircraft.

The apparatus may further comprise a first speed sensor for determining the speed of the first shaft and a second speed sensor for determining the speed of the second shaft. The speed sensors may be operatively connected to the control system to provide shaft speed measurements to the control system.

According to an aspect, a gas turbine engine for an aircraft is provided. The gas turbine engine may comprise an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft. The gas turbine engine comprises a control system according to any aspect or embodiment described herein and/or the gearbox, which may be configured in accordance with any aspect or embodiment described herein. For such a gas turbine the control system may particularly strongly be reducing vibrations that can occur at resonances of the gearbox.

It may be provided that the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure relates to a gas turbine engine. Such a gas turbine engine may comprise an engine core comprising a turbine, a combustor, a compressor, and a core shaft operatively connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 4 is an apparatus having a control system and three shafts;

To

Figure 8:
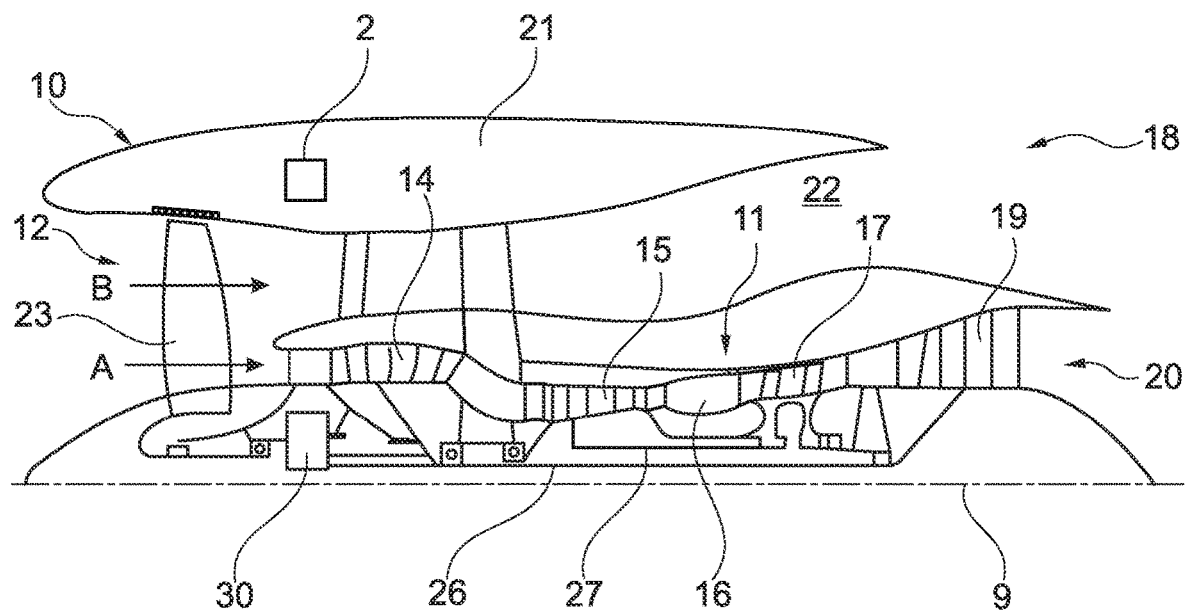
Figure 9:
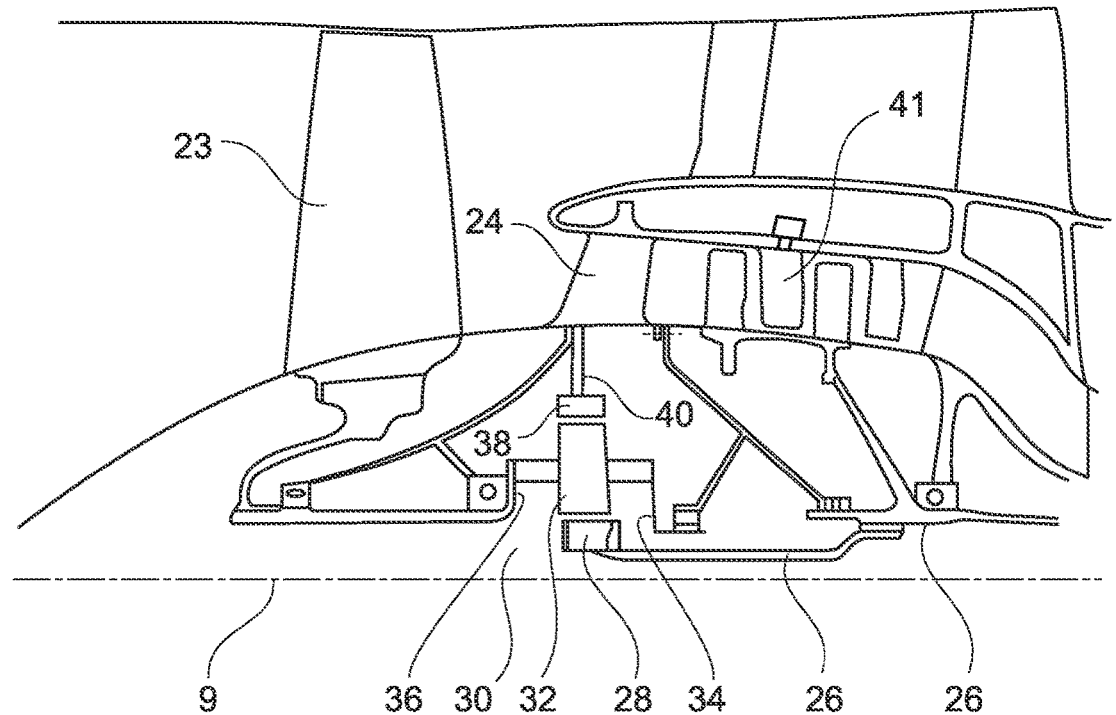
Figure 10:
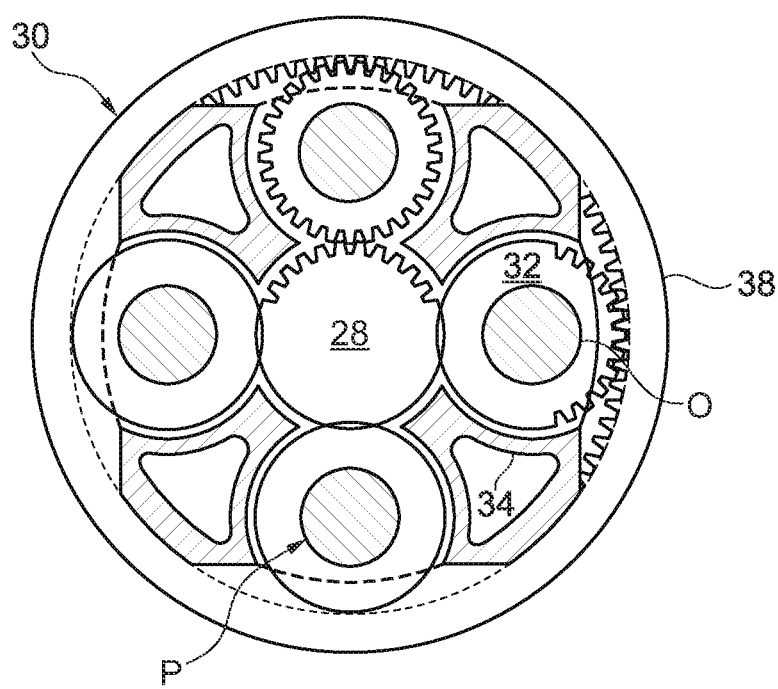
Figure 11A:
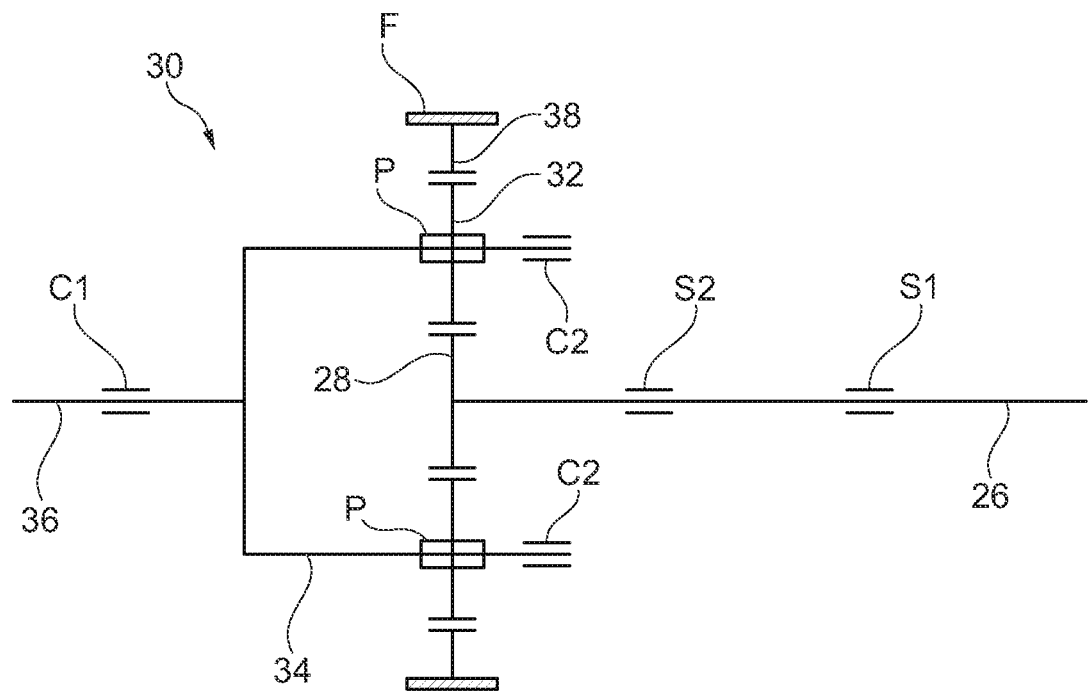
Figure 11B:
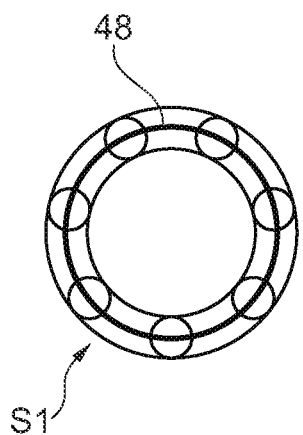
Figure 12:
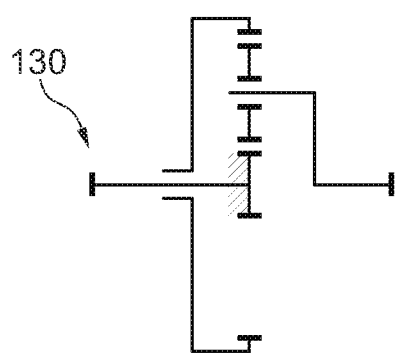
Figure 13:
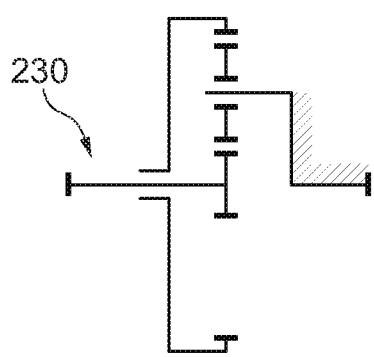
Figure 14:
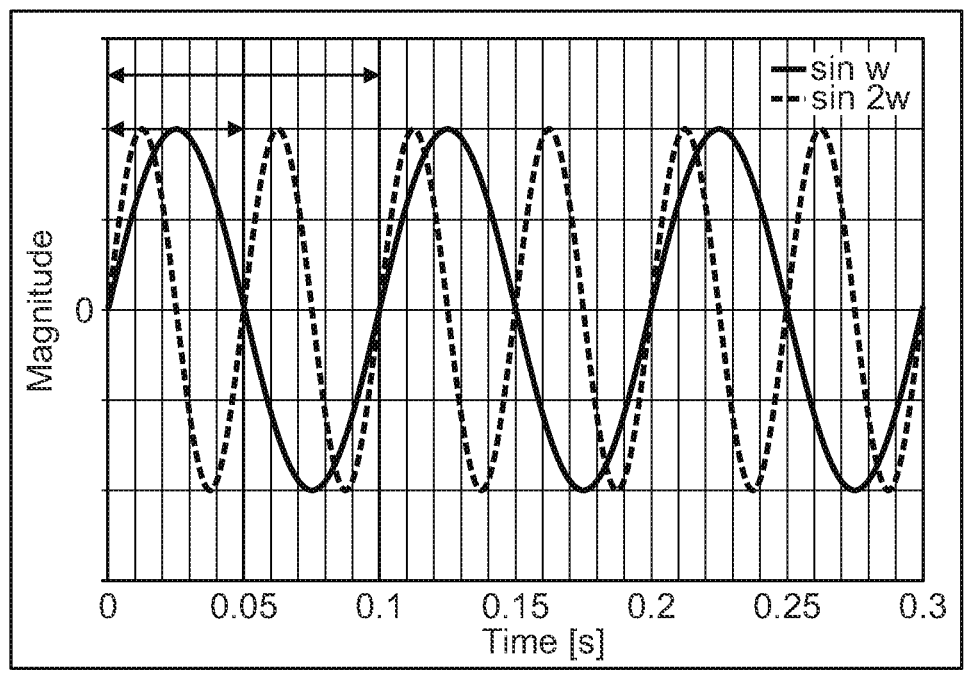
Figure 15:
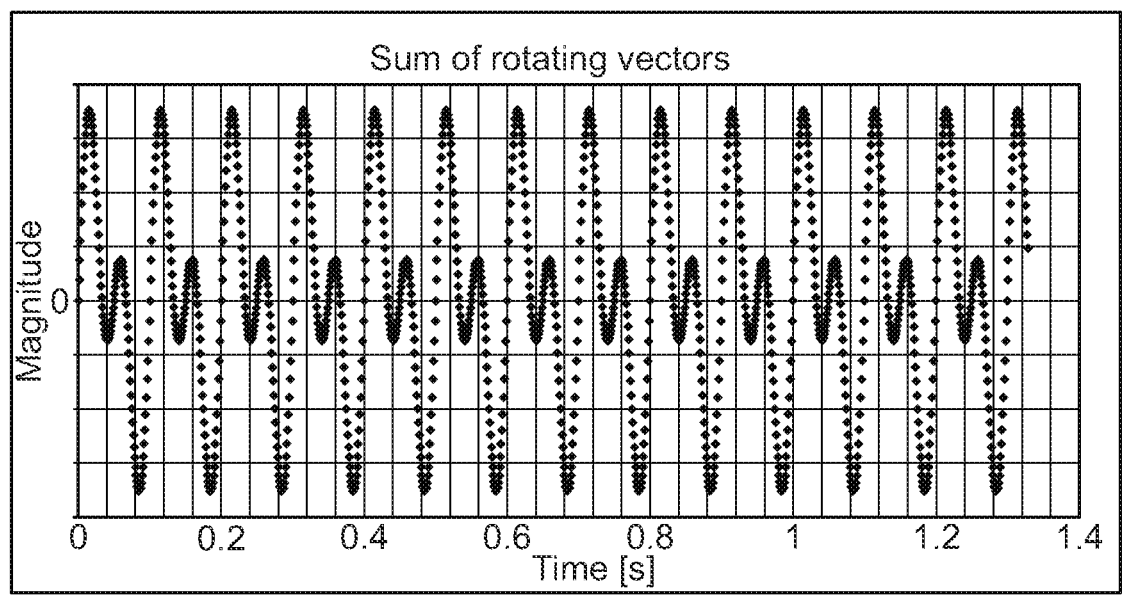
Figure 16:
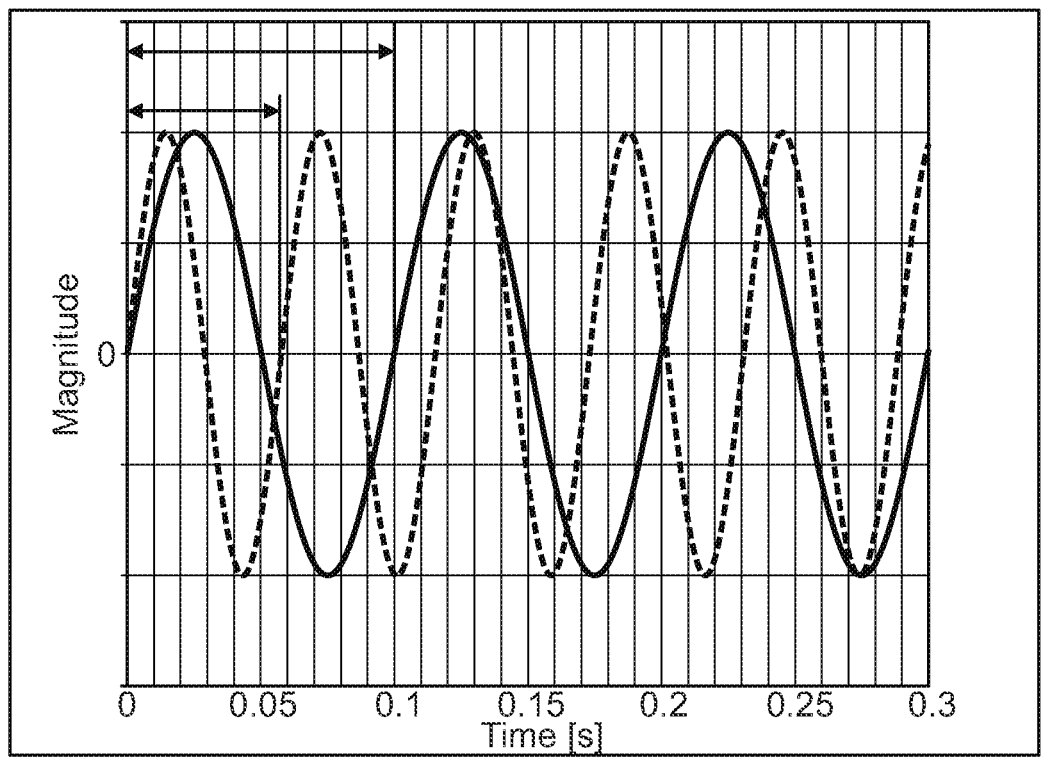
Figure 17:
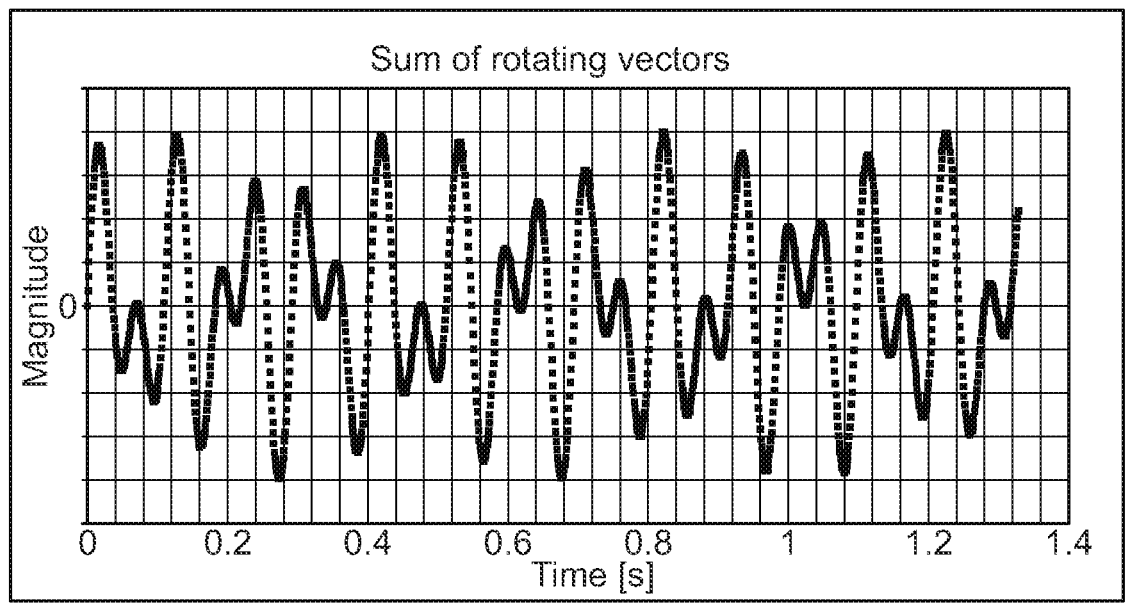
Figure 18:
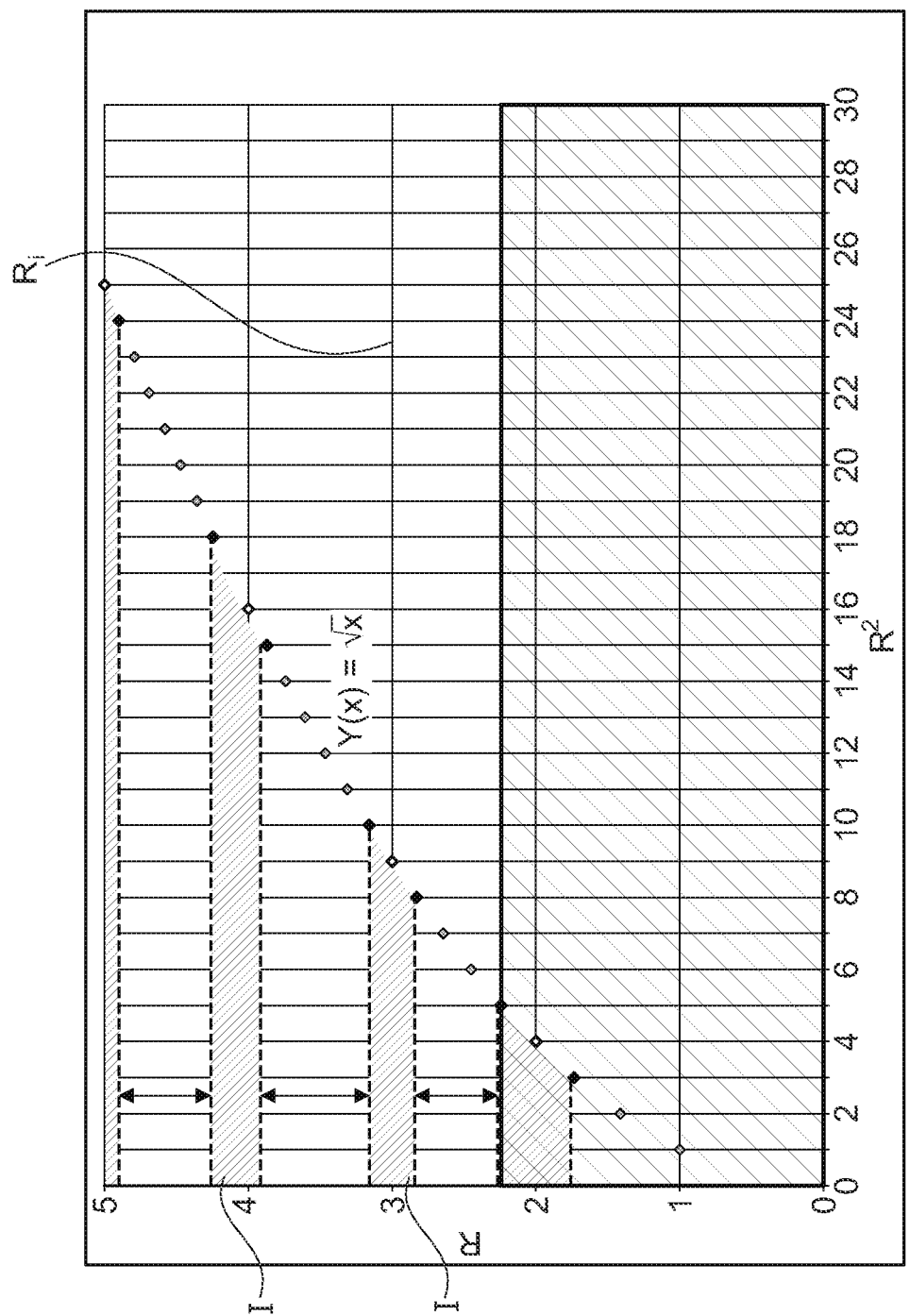
Figure 19:
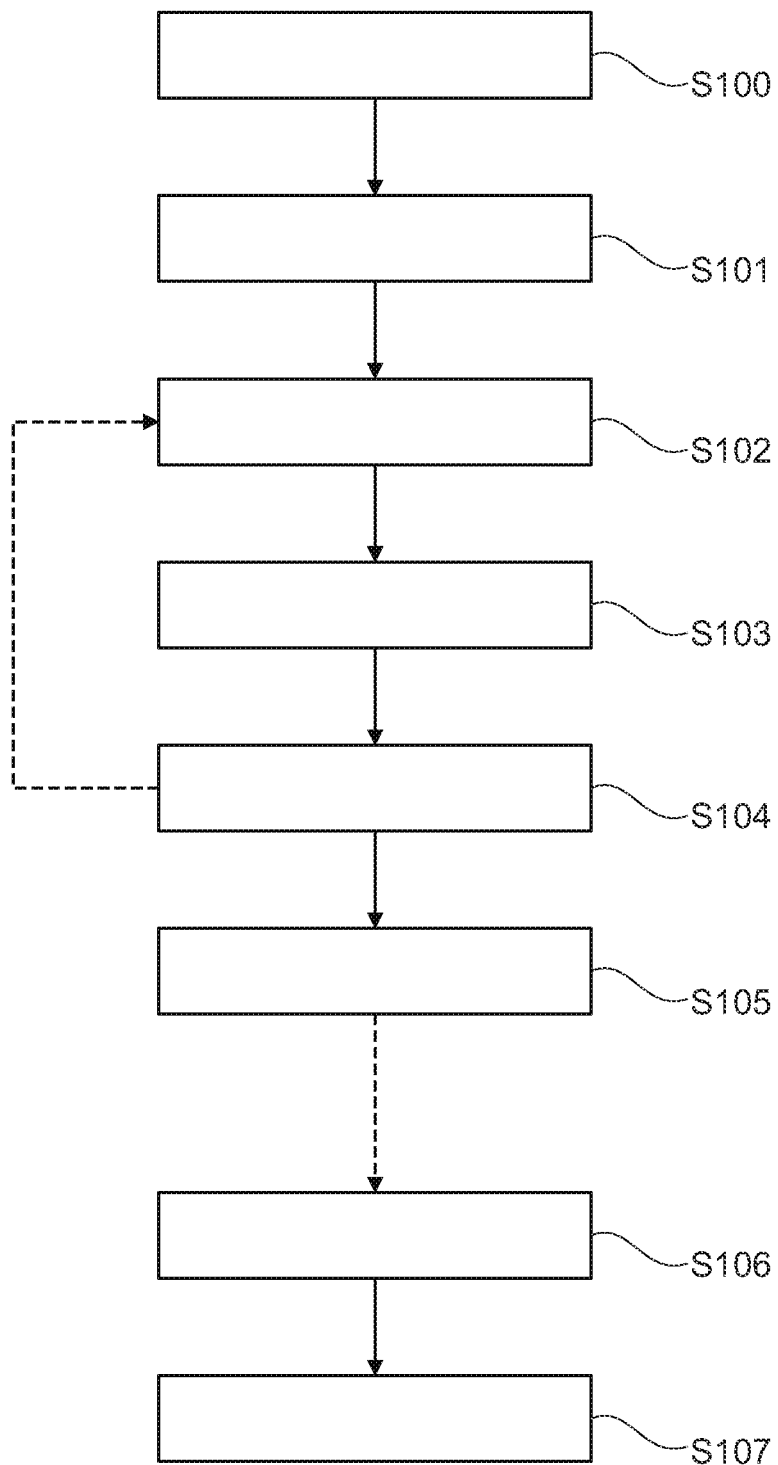
Figure 20:
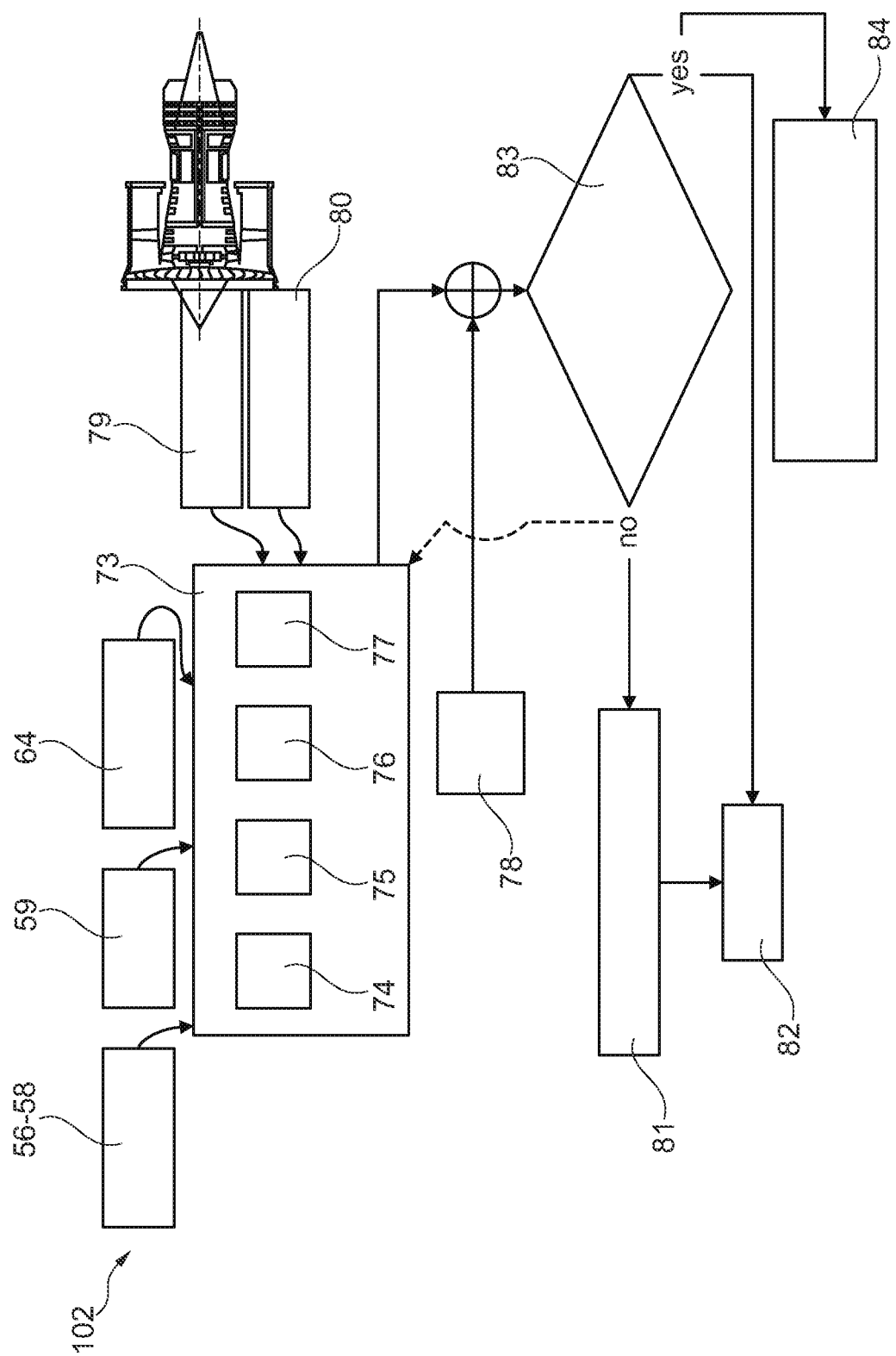
Figure 21:
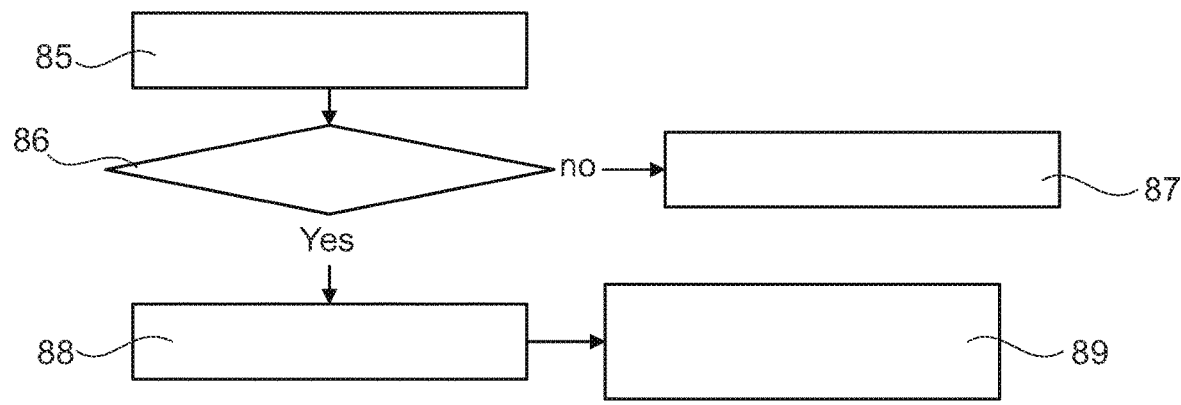
Figure 22:
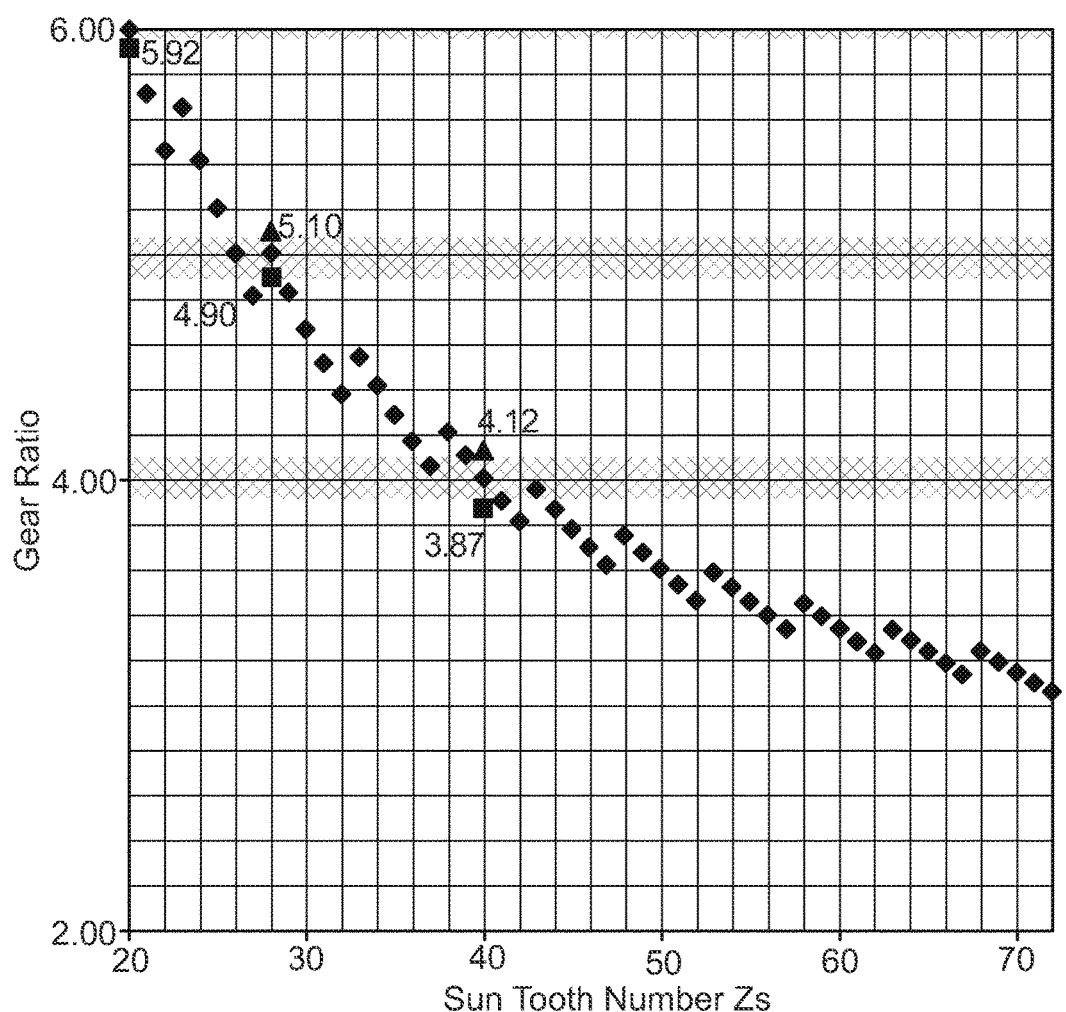
Figure 23:
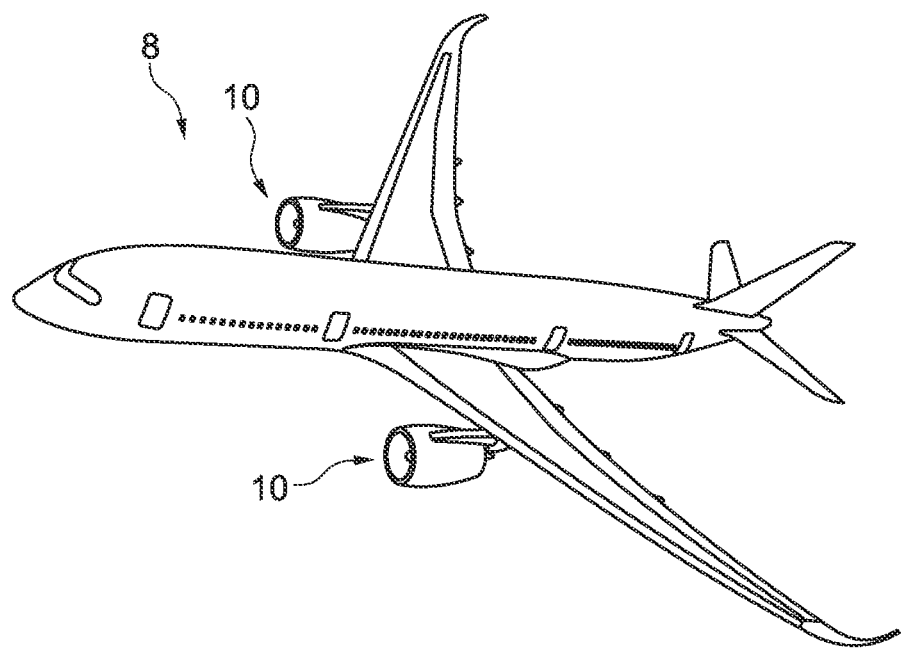

FIG. 8 is a perspective view of an aircraft having a plurality of gas turbine engines;

FIG. 9 is a sectional side view of a gas turbine engine;

FIG. 10 is a partially cut-away view of a gearbox for a gas turbine engine;

FIG. 11A shows a schematic view of a gearbox for a gas turbine engine;

FIG. 11B shows a rolling bearing of the gearbox of FIG. 11A;

FIGS. 12 and 13 shows schematic views of gearboxes for a gas turbine engine;

FIG. 14 is a diagram of magnitudes of oscillations of two components of a gearbox rotating at an integer speed ratio;

FIG. 15 is a diagram of the sum of the magnitudes according to FIG. 14;

FIG. 16 is a diagram of magnitudes of oscillations of two components of a gearbox rotating at a speed ratio that is different from an integer, more precisely, that is irrational in this example;

FIG. 17 is a diagram of the sum of the magnitudes according to FIG. 16;

FIG. 18 is a diagram showing integer values of speed ratios and disallowed intervals around these integer values, as well as allowed intervals for speed ratios of components of a gearbox between the disallowed intervals that are obtained with a parameter k that equals 1;

FIG. 19 shows a method for manufacturing a gearbox;

FIG. 20 shows a control system for controlling an apparatus having at least a first shaft and a second shaft and/or a gearbox;

FIG. 21 shows a flow chart for handling residual frequencies;

FIG. 22 shows a diagram to determine an optimal sun gear tooth number for a given type of gearbox; and FIG. 23 is an aircraft having a plurality of gas turbine engines.

DETAILED DESCRIPTION

Figure 1:
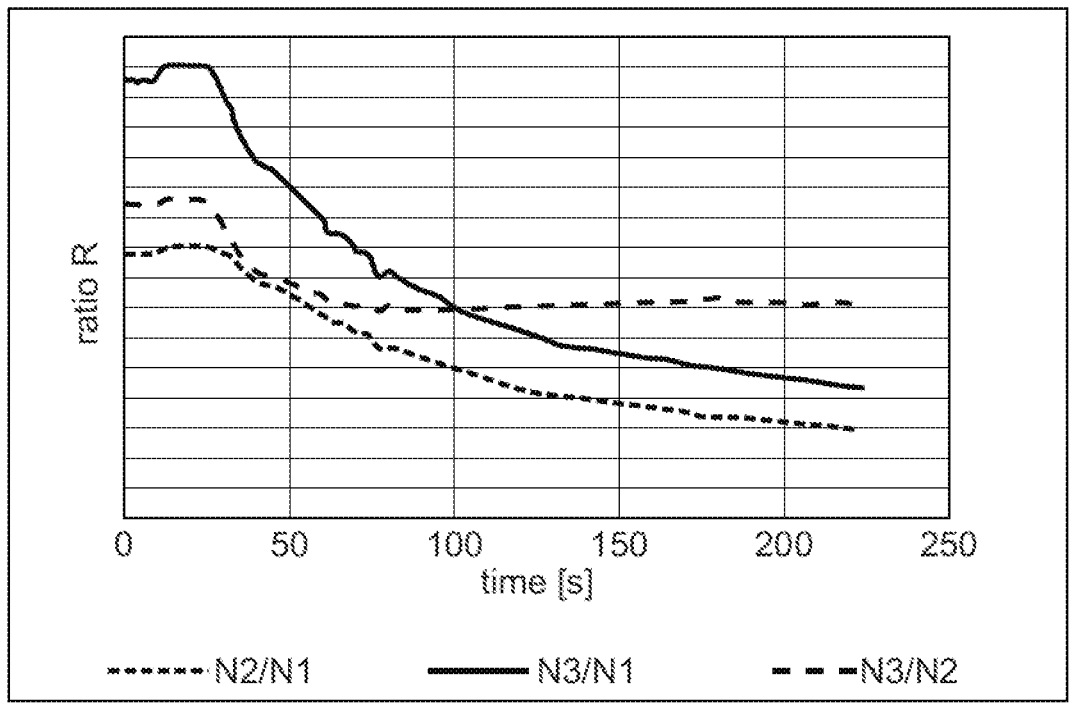
FIG. 1 shows shaft speed ratios of a gas turbine engine with three shafts versus time during acceleration.

FIG. 1 shows shaft speed ratios R versus time of an aircraft gas turbine engine with three shafts, herein denoted as N1-N3, during an acceleration of the engine. The three different curves show the speed ratios of the three combinations of the shafts N1-N3. The curve N3/N2 is shown at a different scale than the other two curves. From FIG. 1 it becomes apparent that the shaft speed ratios R may substantially change during operation of the gas turbine engine. It is worth noting that in this example the gas turbine engine does not comprise a power gearbox. All the speed ratios R are defined by speed controller performance targets.

Figure 2:
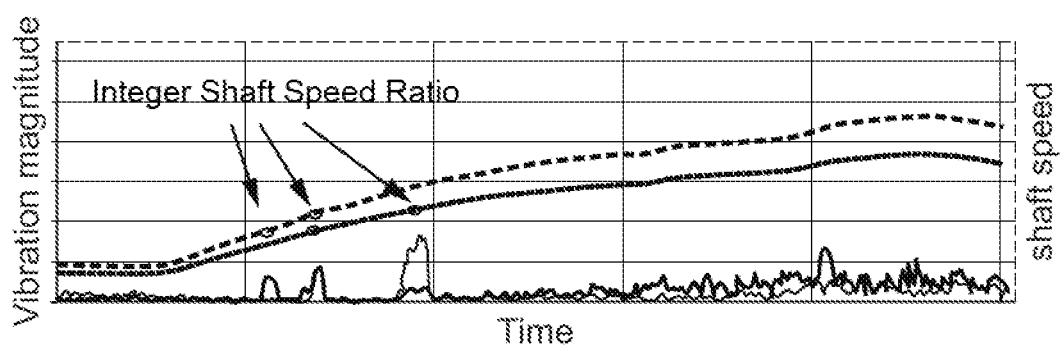
FIG. 2 shows the increase of vibrations in the region of integer shaft speed ratios.

FIG. 2 shows in thick and thin lines and versus time shaft speeds (dashed lines) and vibration magnitudes (solid lines) of two shafts of a gas turbine engine as an example for any kind of a machinery having two or more shafts that are rotatable at variable speed ratios. The dots represent integer speed ratios.

Imbalances of the shafts and/or other components may lead to vibrations of the shafts. Then, one of the shafts may excite a vibration of another one of the shafts. This occurs particularly in dependence on the ratio of the rotational speeds of the shafts.

Arrows in FIG. 2 point at several occurrences of integer shaft speed ratios. It becomes clear from FIG. 2 that at these points in time, the vibration magnitudes at the sensor locations are strongly increased with respect to neighboring points in time where the shaft speed ratios R are far enough from an integer.

Figure 3:
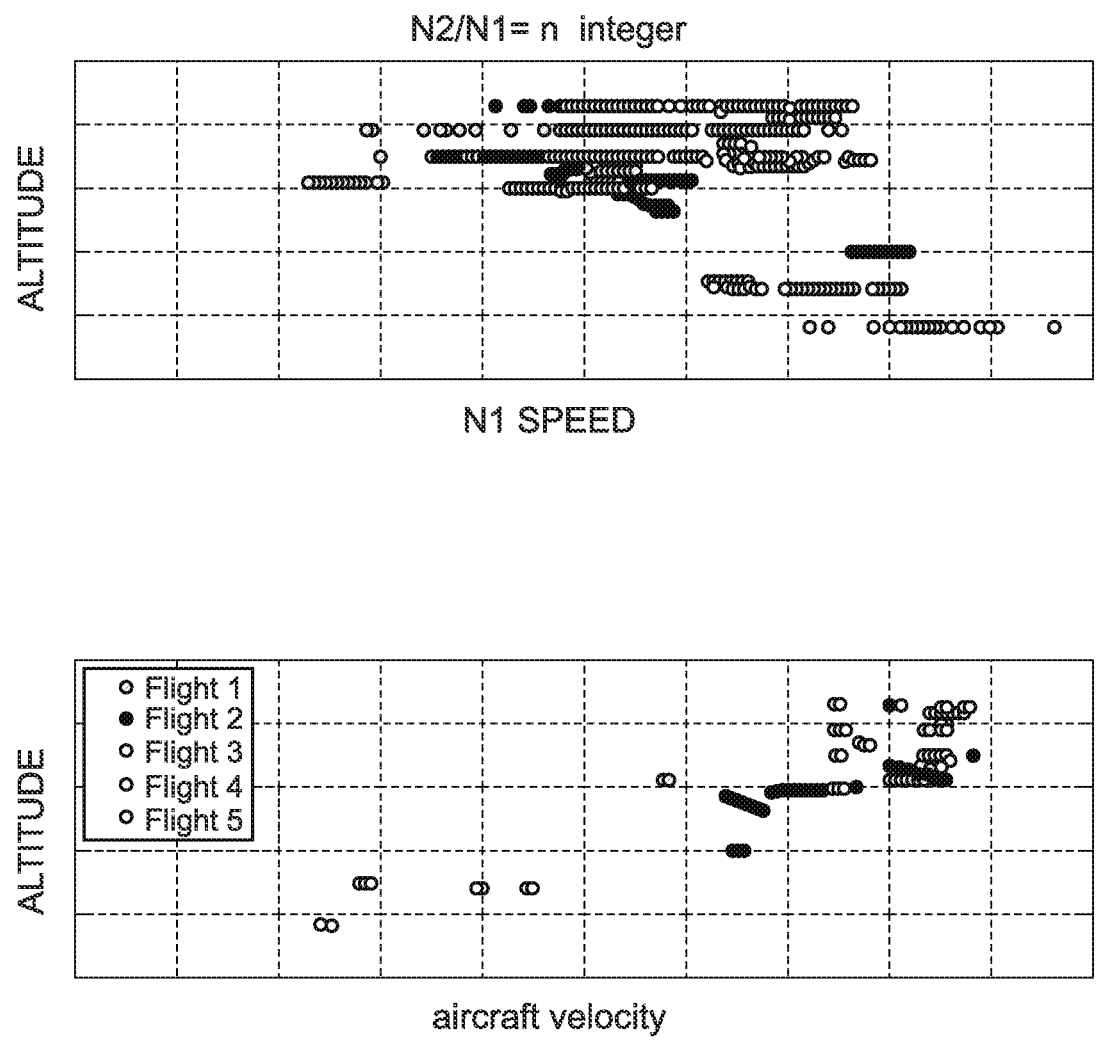
FIG. 3 shows occurrences of integer shaft speed ratios of an aircraft gas turbine engine during various test flights.

FIG. 3 shows occurrences of integer shaft speed ratios of the N2 and N1 shafts in five different test flights of a gas turbine engine. The upper diagram shows the integer shaft speed ratio occurrences at different flight altitudes and versus the speed of the N1 shaft. The lower diagram shows the same versus the aircraft velocity. It becomes apparent that in specific operational statuses of the gas turbine engine integer shaft speed ratios occur more often than in others. All these integer conditions generated high vibration in the flight.

It is also worth noting that integer shaft speed ratios, in other words, one shaft rotating at a speed being a multiple of the speed of another shaft, are particularly prone to generate low-frequency vibrations that may generate amplitude modulations on measured engine parameters, such as speeds, vibration, air, oil and fuel intake, variable nozzle geometry, variable vane geometry, propeller or rotor pitch angle, cooling valves, torque, thrust etc., in the form of beatings. Beatings are known to be potentially detrimental when they enter an engine control loop and can be amplified by an actuation system in the attempt to minimize the error. Low frequency vibration cycles can exacerbate fatigue life consumption that needs to be taken into account to ensure engine structural integrity. This is addressed by control systems and methods described below.

FIG. 4 schematically shows an apparatus 1 comprising three shafts 26, 27, 54 and a control system 2 for controlling the apparatus 1.

The apparatus 1 comprises a stationary support structure 24 which supports a plurality of bearings 52, 53, 55. Each one of the shafts 26, 27, 54 is rotatably supported on the stationary support structure 24 by means of (a pair of) bearings 52, 53, 55. Optional damping 51 (e.g. including an oil-film damper) may be interposed between the stationary support structure 24 and one or more bearings 52, 53. An optional intershaft bearing 50 supports one shaft on another.

In the present example the shafts 26, 27, 54 are coaxially arranged and rotatable around the same axis of rotation. An outer shaft 26 surrounds an intermediate shaft 27 and an inner shaft 54. The intermediate shaft 27 surrounds the inner shaft 54.

A speed sensor 56-58 for each of the shafts 26, 27, 54 measures the rotational speed of the respective shaft 26, 27, 54 with respect to the stationary support structure 24. The speed sensors 56-58 are communicatively coupled to the control system 2.

To reduce vibrations in the apparatus 1, the control system 2 is adapted to control rotation of at least one of the shafts 26, 27, 54, in particular all of the shafts 26, 27, 54, depending on one or more speed ratios of the rotational speeds of the shafts 26, 27, 54.

The control system 2 receives speed sensor 56-58 readings and determines ratios of the shaft speeds. In case that a pair of shafts 26, 27, 54 has a speed ratio that is close to or approaching (e.g., inside or entering an interval of) an integer value, the control system 2 reacts by controlling rotation of one or more, e.g. all of the shafts 26, 27, 54 to change the respective shaft speed, so that the corresponding speed ratio is again far enough (e.g., outside the interval) from the integer value. The control system 2 particularly monitors integer values of 2, 3, 4, 5, 6 or greater.

Thus, the control system 2 is adapted to control rotation of the shafts 26, 27, 54 depending on speed ratios. In particular it is adapted to restrict the rotation of the shafts 26, 27, 54 to predetermined speed ratios.

The control system 2 may be adapted to avoid some or all possible integer shaft speed ratios, optionally for all shaft speed ranges, or for a subset of shaft speed ranges.

By avoiding integer shaft speed ratios by means of the control system 2 at least in some situations and/or at least in specific shaft speed ranges, some or all of the peaks in vibration magnitude such as shown in FIG. 2 may be prevented.

The apparatus 1 may be used in a gas turbine engine, in particular it may form a part of a gas turbine engine. The gas turbine engine may be a three-shaft engine. Each of the shafts 26, 27, 54 may be driven by a turbine stage, and drive a compressor stage and/or a fan. The outer shaft 26 may also be referred to as N1 shaft, the intermediate shaft 27 may be referred to as N2 shaft and the inner shaft 54 may be referred to as N3 shaft. One of the shafts 26, 27, 54 may be referred to as a first shaft, another one as a second shaft.

The control system 2 may serve as an engine speed controller.

Figure 5A:
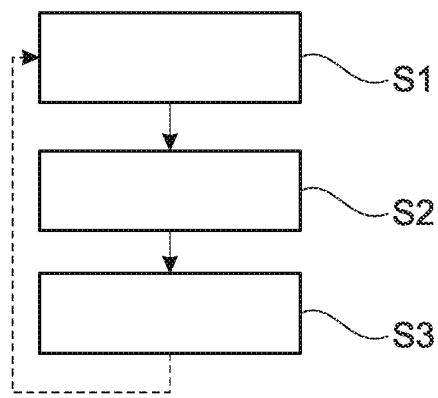
FIGS. 5A and 5B show methods for controlling an apparatus having at least a first shaft and a second shaft.

FIG. 5A shows a method for controlling an apparatus having at least a first shaft and a second shaft that are rotatable with a variable ratio of speeds, e.g. the apparatus 1 according to FIG. 4. The method is for reducing vibrations in the apparatus.

The method comprises a first step S1 of determining a speed of the first shaft (e.g., the outer shaft 26 or the intermediate shaft 27) and a speed of the second shaft (e.g., the intermediate shaft 27 or the inner shaft 54, respectively). In the apparatus 1 of FIG. 4, this may comprise receiving, by the control system 2, sensor readings from the speed sensors 56-58.

The method further comprises a second step S2 of calculating a speed ratio R of the determined speeds of the first and second shafts (e.g., shafts 26, 27, 54) and determining whether or not the calculated speed ratio R is within a predetermined interval (e.g., +/−10% or +/−5%) around an integer value. Alternatively or in addition, the interval may be defined around an integer Ri as $$\left(\sqrt[2]{(Ri^2 - k)}, \sqrt[2]{(Ri^2 + k)}\right),$$

wherein k is an integer, in particular a positive integer, e.g. 1. The variable k may particularly be selected such that each of the two limits of the interval assumes a value between the integer Ri and the respective next lower (Ri−1) or higher (Ri+1) integer. The integer Ri may be 1 or, in particular, larger than 1. The above interval allows wide flexibility in usable speeds while at the same time avoiding speed ratios that are prone to create strong vibrations.

The method further comprises a third step S3 of controlling rotation of the at least one of the shafts depending on the calculated speed ratio R including restricting the rotation of the shafts (e.g., shafts 26, 27, 54) to predetermined speed ratios by increasing or decreasing a speed of at least one of the shafts so as to avoid an integer ratio of speeds of the shafts and to avoid a ratio of speeds of the shafts within the disallowed interval.

The method may stop after the third step S3, or return to the first step S1 thereafter.

Figure 5B:
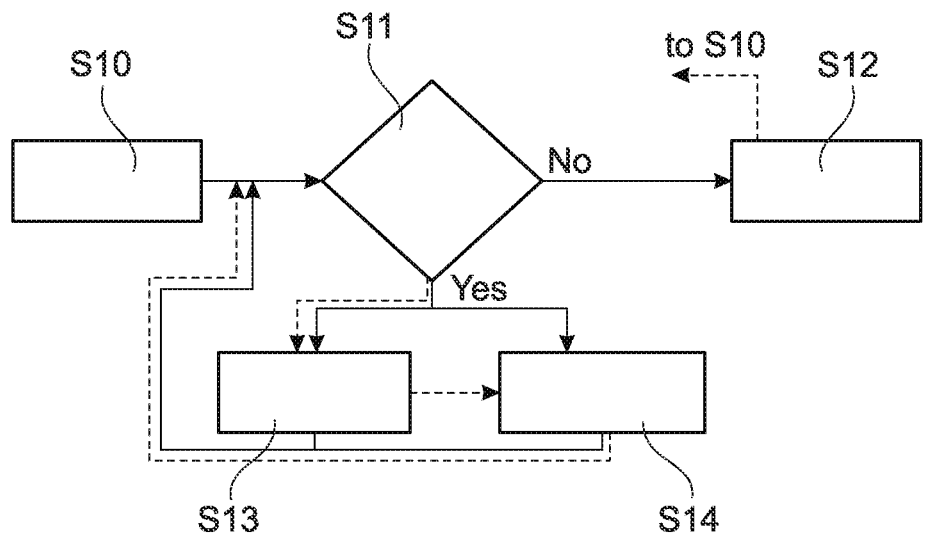

FIG. 5B shows a method for controlling an apparatus in the form of a gas turbine engine, having at least a first shaft and a second shaft that are rotatable with a variable ratio of speeds, e.g. the apparatus 1 according to FIG. 4.

At step S10, a power setting demand for the engine is received.

At step S11, it is evaluated whether or not the shaft speeds of the shafts of the engine are in a range for cross-excitation, e.g. at or close to an integer value, and/or whether or not the shaft speeds will enter such a range when the power setting demand is fulfilled. This may comprise performing steps S1 and S2 of FIG. 5A. It may also comprise determining or predicting shaft speeds of the shafts when the power setting demand is fulfilled, and performing step S2 of FIG. 5A with these shaft speeds.

If it is evaluated in step S11 that the shafts are not and/or will not be in speed ranges prone for cross-shaft excitation, the method proceeds to step S12. Otherwise the method proceeds with steps S13 and S14. As said, this may particularly be based on the interval around the integer defined as $$\left(\sqrt[2]{(Ri^2 - k)}, \sqrt[2]{(Ri^2 + k)}\right).$$

At step S12 no change in the power setting demand is made. The power setting demand is fulfilled by correspondingly controlling the engine. The method may return to step S10.

At step S13, it is evaluated whether or not a variable device of the gas turbine engine is within an acceptable range of movement. Adjustment of the variable device changes the speed of one or more of the shafts. For example, the acceptable range of movement may be a predetermined interval around a given set point. As a further example, the variable device is a variable stator vane of the gas turbine engine. The acceptable range may be in interval around a set point of the variable stator vane position, e.g. +/−3%. The gas turbine engine may be a 3-shaft engine. In this case, the variable stator vane may be that of an intermediate-pressure shaft of the gas turbine engine, in particular of an intermediate-pressure compressor. Alternatively, the gas turbine engine may be a 2-shaft engine, in particular a geared 2-shaft engine (that may comprise a fan driven via a gearbox). In this case, the variable stator vane may be that of an intermediate-pressure compressor and/or of a high-pressure compressor of the gas turbine engine. Optionally, the gas turbine engine may be a turboprop engine, and the variable device may be a propeller pitch. The gas turbine engine may have a plurality of variable devices to be adjusted alternatively or in addition to one another in step S13. For example, a turboprop engine may have a variable propeller pitch and variable stator vanes, e.g. at a high-pressure compressor.

When the variable device is within the acceptable range of movement, the variable device is adjusted (within the acceptable range) so that the speed of the shaft is changed, particularly in such a way that the shafts do not enter or exit the speed range prone for cross-shaft excitation. Otherwise, the variable device is not adjusted in step S13.

At step S14, it is evaluated whether or not a current power setting demand is within an acceptable range around the power setting demand received in step S10, e.g. +/−1%. When this is the case, the current power setting demand overrides the power setting demand received in step S10. In other words, a received power setting demand is modified (within a predetermined range) so as to avoid shaft speed ranges prone for cross-shaft excitation. When the current power setting demand is not within an acceptable range around the power setting demand received in step S10 (or at an edge of the range), the power setting demand is not modified in step S14.

Steps S13 and S14 may be performed in parallel. Alternatively, the steps may be performed one after the other, e.g. first step S13, then step S14, as indicated in FIG. 5B. Optionally, the performance of one step depends on the outcome of the other step. For example, step S14 is only performed when an adjustment (or when no adjustment) has been made in step S13 or vice versa.

It is noted that alternative embodiments of the method comprise step S13, but not step S14, or step S14, but not step S13.

After steps S13 and/or S14, the method returns to step S11.

Steps S13 and S14 are performed depending on a speed ratio of speeds of the shafts and thus control rotation of at least one of the shafts of the gas turbine engine depending on a speed ratio of speeds of the shafts.

Optionally, steps S13 and S14 are performed in combination to move the adjustable device within the acceptable range and, additionally, modify the power setting demand within its acceptable range. This allows to optimize a specific fuel consumption (SFC) of the gas turbine engine.

It is thus possible to maintain an optimized engine performance while minimizing or eliminating integer speed conditions from a flight envelope.

Optionally, integer shaft speed ratios are only avoided in specific shaft speed ranges and/or during transient integer speed maneuvers.

Cross-shaft vibrations may occur when forces from a shaft are transmitted via a static structure, optional inter-shaft bearings and optional fluid, and excite a resonance of another shaft which happens to exist at the given speed condition.

Figure 6A:
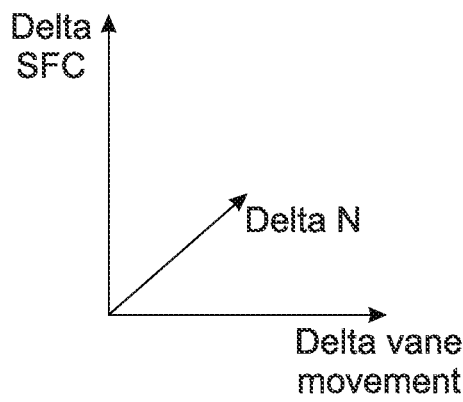
FIGS. 6A and 6B show diagrams for minimizing fuel consumption, wherein the diagrams indicate how to achieve a delta N to exit a region of cross-shaft excitation, by modifying a delta vane movement and a delta power setting parameter to minimize a delta SFC.
Figure 6B:
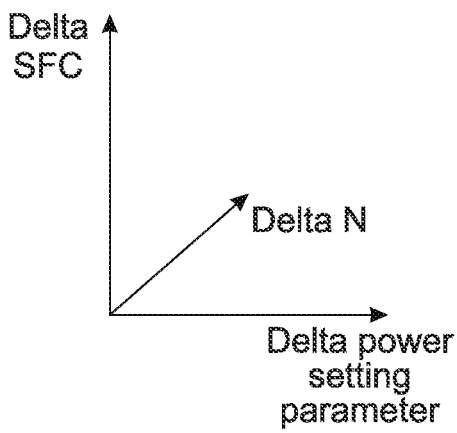

FIGS. 6A and 6B show corresponding diagrams to indicate a change of the SFC ("delta SFC") depending on a variable stator vane adjustment ("delta vane movement") and a shaft speed change ("delta N"), see FIG. 6A, and on a power setting demand adjustment ("delta power setting parameter") and the shaft speed change ("delta N"), see FIG. 6B. For a given gas turbine engine the specific curves of the diagrams of FIGS. 6A and 6B are determined by measurements and/or simulations. When performing steps S13 and S14, a change in shaft speed ("delta N") is given (e.g., the change of the shaft speed necessary to exit the region of cross-shaft excitation) and the variable stator vane adjustment and power setting demand adjustment are modified so as to minimize the SFC.

Figure 7:
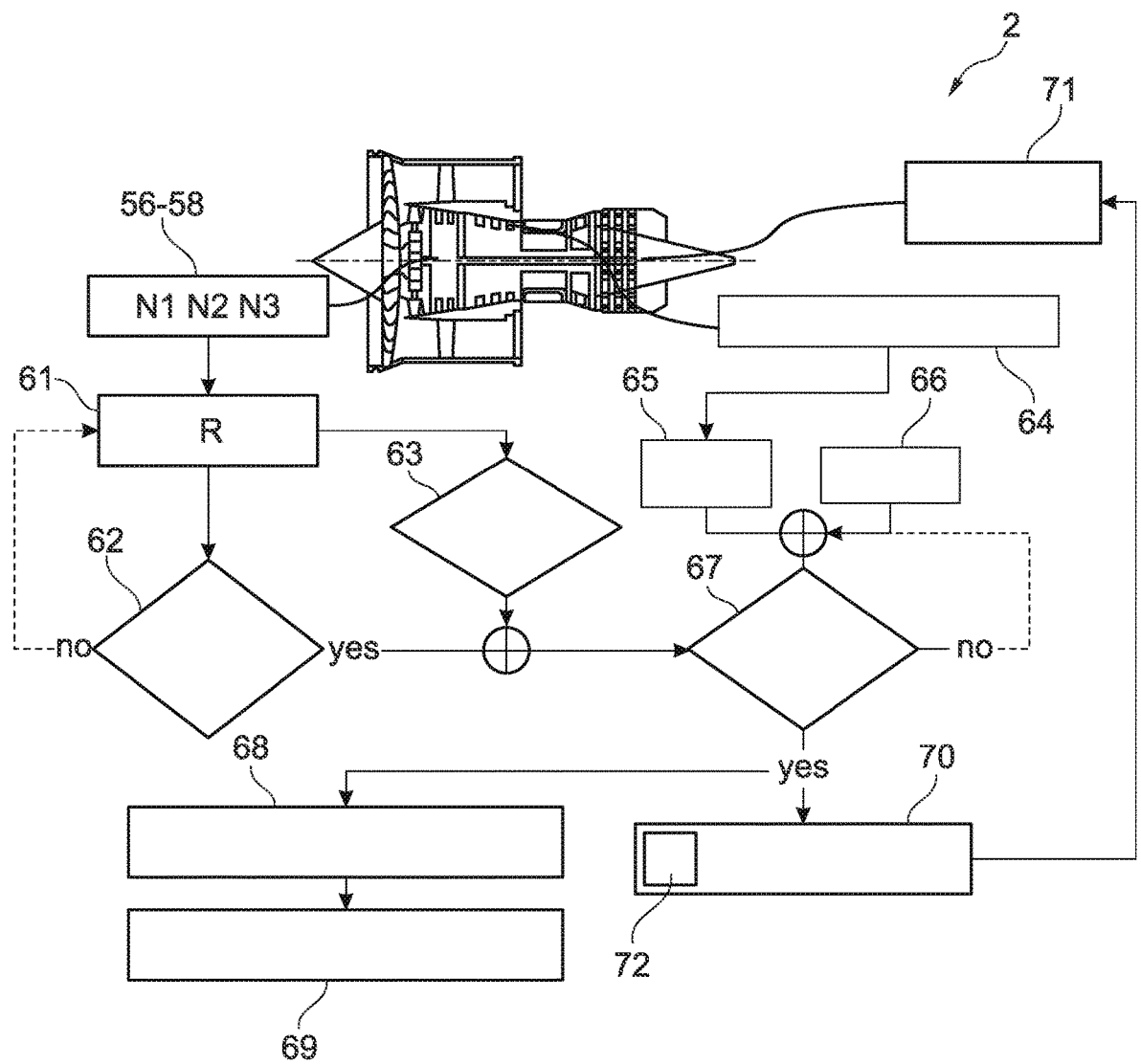
FIG. 7 shows a control system for controlling an apparatus having at least a first shaft and a second shaft.

FIG. 7 shows a control system 2 for controlling an apparatus (e.g., the apparatus 1 of FIG. 4) having at least a first shaft and a second shaft, the shafts being rotatable with a variable ratio of speeds. In FIG. 7, the apparatus is shown as a gas turbine engine, but other types of apparatuses are also conceivable.

The apparatus comprises at least one speed encoder or speed sensor 56-58 for each of the shafts to determine the speed of the respective shaft. Optionally, the speed sensors 56-58 may be regarded as a part of the control system 2, or as a part of an arrangement comprising the control system 2 and the speed sensors 56-58.

The speed sensors 56-58 (e.g., periodically or continuously) provide sensor readings indicative for the shaft speeds to a calculator 61 of the control system 2. The calculator 61 determines one or more shaft speed ratios R, e.g. a shaft speed ratio R for each combination of two of the shafts based on the sensor readings. The calculator 61 provides the determined shaft speed ratio(s) R to a near-integer-speed-ratio detector 62. The near-integer-speed-ratio detector 62 determines whether or not the determined shaft speed ratio(s) R are within a predetermined distance or interval to an integer value (in particular greater than 1). If this is not the case, the calculator 61 is invoked again. If this is the case, the near-integer-speed-ratio detector 62 triggers a resonance detector 67, e.g., informs the resonance detector 67 about the near-integer status. The near-integer-speed-ratio detector 62 may provide the speed ratio(s) to the resonance detector 67.

An optional state detector 63 may also receive the shaft speeds and/or the shaft speed ratio(s) R, and/or may be triggered, e.g. by the calculator 61. The state detector 63 may determine whether the shafts are in a steady state or in a transient state, e.g. moving at constant speeds or accelerating/decelerating, respectively. Optionally, the resonance detector 67 is only invoked when the state detector 63 determines a predetermined state, e.g. a transient state or a steady state.

One or more vibration sensors 64 are part of the control system 2 and/or the apparatus and are adapted to generate vibration sensor readings indicative for vibrations in the apparatus. The vibration sensor(s) 64 provide the vibration sensor readings to an analyzer 65. The analyzer 65 determines vibration magnitudes (e.g., frequency-dependent, and/or vibration frequencies) based on the vibration sensor readings. When or more vibration magnitudes (e.g. at predetermined vibration frequencies) exceed a threshold stored in a storage 66, the resonance detector 67 is triggered. For example, the analyzer 65 provides the vibration magnitudes to the resonance detector.

Optionally, the resonance detector 67 detects incoming resonances before reaching a maximum.

When the resonance detector 67 is triggered by the near-integer-speed-ratio detector 62 and the analyzer 65, it activates an integer-speed avoidance system 70.

The integer-speed avoidance system 70 is operatively connected with one or more engine controllers 71. The engine controller(s) 71 are adapted to adjust engine parameters, e.g., variable stator vane positions and/or fuel flow. The integer-speed avoidance system 70 may comprise an algorithm to avoid integer speed ratios so as to minimize vibrations while optimizing the engine performance in a flight envelope.

Together with the engine controller(s) 71, the integer-speed avoidance system 70 may be adapted to perform the method steps S3, S13 and/or S14 of FIGS. 5A and 5B.

To ensure high engine performances throughout the whole flight envelope, the integer-speed avoidance system 70 may be adapted to detect if there is any conflict between the achievement of a performance target and the integer speed avoidance. If any disadvantage in regulating the speeds that provokes deterioration in the engine performance is detected, then it may determine whether or not to adjust set points of the engine controller(s) 71. In case the vibration levels trigger the activation of the integer-speed avoidance system 70 due to a detection of an incoming cross shaft resonance, the performance deterioration may be minimized to a given (e.g. the shortest possible) period of time. It may be provided that the integer-speed avoidance system 70 is only allowed to adjust set points of the engine controller(s) 71 when a level of vibration exceeds a given safety threshold. Optionally, residual frequencies are identified and filtered out from an engine controller loop. Further, a file consumption of components may be determined based on the residual frequencies (e.g., taking into account a periodicity per second).

The integer-speed avoidance system 70 optionally comprises a database 72 storing a plurality of possible operational statuses of the apparatus and appropriate speeds of the shafts for each operational status having no integer ratio. In particular, the database 72 may comprise at least one series of possible successive operational statuses and appropriate speeds of the shafts for each operational status having no integer ratio. By this, integer speed ratios may be prevented from occurring at different operational statuses (see FIG. 3) before they occur.

The database 70 may be updated during operation of the apparatus, e.g. a flight of a gas turbine engine, after detecting an integer shaft speed ratio in an operational status.

Additionally, an optional counter 68 may be invoked that performs an algorithm for counting life cycles of the apparatus based on the detected speed ratios and vibration magnitudes. The counted life cycles are stored in a data storage 69 for storing life-consumption data. By this, wear parts of the apparatus may be effectively monitored and the timing of maintenance may be improved. In particular, it is possible to estimate the life consumption caused by cross-shaft system resonances. A complete life estimation may mitigate risks related to unexpected failures in flight and allows a reduction of repairs and unplanned maintenances of fleets.

The control system 2 may be adapted to perform the method according to FIG. 5A and/or according to FIG. 5B. Accordingly, the methods of FIGS. 5A and 5B may comprise method steps that correspond to one or more blocks of FIG. 7. It is also worth noting that one or more blocks of FIG. 7 may be implemented by hardware and/or software, and that one or more blocks of FIG. 7 may be combined in one single block.

An optional embodiment of the control system 2 comprises a sensor to sense vibration of the engine; a detector to detect engine performance; a storage to pre-store engine performance data (e.g., fuel consumption, minimum speed, thrust and/or other data) and to pre-store critical vibration data; and a controller that activates a first control means to control the speed of a first shaft of the shafts and/or a second shaft of the shafts based on sensed vibration data; wherein the controller activates a second control means to disable the first control means, if the detected engine performance data is lower than the pre-stored engine performance data, and the controller overrides the second control means and activates the first control means, if the level of vibration in resonance exceeds the pre-stored critical vibration data.

FIG. 8 illustrates a gas turbine engine 10 for an aircraft. The gas turbine engine 10 has a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 (low-pressure shaft) and an epicyclic gearbox.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27 (high-pressure shaft). The fan 23 generally provides the majority of the propulsive thrust. The epicyclic gearbox 30 is a reduction gearbox.

The gas turbine engine 10 comprises the control system 2 according to FIG. 7 or according to FIG. 4

An exemplary arrangement for a geared fan gas turbine engine 10 is shown in FIG. 9. The low pressure turbine 19 (see FIG. 8) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

The epicyclic gearbox 30 is shown by way of example in greater detail in FIG. 10. Each of the sun gear 28, planet gears 32 and ring gear 38 comprise teeth about their periphery to intermesh with the other gears. However, for clarity only exemplary portions of the teeth are illustrated in FIG. 10. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

In the present example, the sun gear 28 is a floating sun, i.e., it has at least one translational degree of freedom with respect to one or more other components of the gearbox 30 (and/or with respect to a fixture of the gearbox 30). In the present example, the sun gear 28 may move in a radial direction (by a given way of travel always maintaining a meshed condition with all planet gears 32). By this, the sun gear 28 may automatically be optimally positioned with respect to actual loads. Alternatively or in addition, an axial movement may be allowed for the sun gear 28 (maintaining meshing conditions).

The epicyclic gearbox 30 illustrated by way of example in FIGS. 9 and 10 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 9 and 10 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 9 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 9. For example, where the gearbox 30 has a star arrangement (described above), the skilled person would readily understand that the arrangement of output and support linkages and bearing locations would typically be different to that shown by way of example in FIG. 9.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 8 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 8), and a circumferential direction (perpendicular to the page in the FIG. 8 view). The axial, radial and circumferential directions are mutually perpendicular.

It is further worth to mention that, as an optional extension of the method and control system, integer transmission ratios are avoided in a power and/or accessory gearbox, e.g. within the gearbox(es) and/or with reference to a rotating component (e.g. a shaft) of the gearbox (e.g. gearbox 30) and one of the shafts of the engine, (e.g. one of the shafts 26, 27, 54).

In this regard, reference is made to FIG. 11A, showing a gearbox 30 schematically (e.g. the gearbox 30 of FIG. 10). In this case, the ring gear 38 is fixed to a fixture F, i.e., is fixed with respect to the nacelle 21 of the gas turbine engine 10. The planet gears 32 are rotatably mounted on the planet carrier 34 by means of planet journal bearings P. The planet carrier 34 is rotatably mounted with respect to the fixture F by means of carrier roller bearings C1, C2. Linkages 36 are fixedly connected to the planet carrier 34 as an output (shaft). The planet gears 32 mesh with the ring gear 38. Further, the planet gears 32 mesh with the sun gear 28. The sun gear 28 is rotatably mounted with respect to the fixture F by means of sun roller bearings S1, S2.

Each of the sun gear 28, the planet gears 32 and the planet carrier 34 is rotatable with respect to the fixture F. By meshing teeth of the gears 28, 32, the ratio of rotational speeds of two of these rotatable components is fixed. So, for example, the sun gear 28 may be rotated at different speeds, but the ratio of its speed versus the rotational speed of one of the planet gears 32 (or, e.g., with respect to the planet carrier 34) is constant. Avoiding integer speed ratios (rotational speeds that are a multiple of each other) and in particular speed ratios between $$\sqrt[2]{(Ri^2 - k)} \text{ and } \sqrt[2]{(Ri^2 + k)},$$

can strongly reduce vibrations in use of the gearbox 30. In the present example, the planet gears 32 have coprime numbers of teeth with respect to the sun gear 28 and the ring gear 38, and may particularly each have a prime number of teeth. Alternatively or in addition, another gear of the gearbox 30 may have a prime number of teeth. Optionally, all gears of the gearbox have a prime number of teeth. For gears, the speed depends on the inverse of the tooth number. A gear speed ratio is always a rational number, because the numbers of teeth are integers. In this case the least occurrences of periodicities are obtained by using gears each having a prime number of teeth. In principle, irrational numbers would be the best speed ratio between rotors in terms of vibrations, since the irrational number are not expressible as a ratio of integer numbers. Irrational number series may therefore be applied as converging asymptotes for optimized speed ratios (also when working with a system of rational numbers).

Taking a closer look at the gearbox 30 components, it can be seen that the gearbox 30 comprises further components that are rotatable. One of such components is an oil film O of a journal bearing (see FIGS. 10 and 11A), in this example the oil film O of each planet journal bearing P. By rotation of the planet gears 32 on the planet carrier 34 the oil film O (at least on average) is forced into a rotating motion around a portion of the planet carrier 34. While in general the oil films O are regarded as components of the gearbox 30, specific examples may refer to only solid components of the gearbox 30. An oil film O travels at an average rotating speed synchronous with one or more shafts of the gearbox.

Also the roller bearings C1, C2, S1, S2 of the gearbox 30 comprise further components that are rotatable with respect to the fixture F.

FIG. 11B shows as an example one of the sun roller bearings S1. The sun roller bearing S1 comprises a roller-bearing cage 48. The roller-bearing cage 48 holds adjacent rolling elements of the sun roller bearing S1 at a distance to one another. When the sun gear 28 rotates with respect to the fixture F, the roller-bearing cage 48 is rotated as well.

It has been found that taking into account one or both of the oil film O and the roller-bearing cage 48 (and/or the rollers) of one or more of the bearings of the gearbox 30 when avoiding integer speed ratios allows a significant reduction in the level of vibrations in use of the gearbox 30.

FIG. 12 shows another example of a planetary gearbox 130. In this case the sun gear is fixed, while the planet carrier and the ring gear are used as input and output (or vice versa).

FIG. 13 shows a further example of a planetary gearbox 230, wherein the planet carrier is fixed, while the sun gear and the ring gear are used as input and output (or vice versa).

In the following it will be described with reference to FIGS. 14 to 17 why avoiding integer speeds may reduce the level of vibrations so effectively.

FIG. 14 shows an example of magnitudes of vibration of two rotating components of a gearbox, e.g., the gearbox 30 of FIG. 11A, of an engine, or a general assembly. Both components are shown to have an imbalance as an example, but this vibration could arise from gearbox internal or external forcing at frequency one per revolution. When rotating at a constant speed, the imbalances in each case result in a sinusoidal magnitude of vibration along the time axis. The two components have a fixed ratio of speeds with respect to one another. In the example shown in FIG. 14, the ratio is 2, i.e., an integer. This leads to a periodic interference of the magnitudes of vibration, as shown in FIG. 15. This may result in amplified driving forces that can drive higher deflections in resonance. Moreover, the deflections are periodic with a frequency that depends on the absolute speeds of the two components and form the number of similar occurrences during the rotation. That is, when changing the absolute speeds, e.g., while accelerating, potential resonances of the gearbox or other parts (in particular cross-shaft resonances) may be excited by the periodic amplified deflections. It is worth noting that in engine finite elements models cross-shaft resonances are difficult to model and therefore often generating unexpectedly high vibrations that may even remain unconsidered in the life calculation of engine parts. This modelling difficulty is particular relevant to gearboxes as vibration can be caused by variation in the gear contacts which are a function of extremely small (e.g. less than 10 microns) dimensional changes of the gear teeth profiles.

Turning now to FIG. 16, the magnitudes of the resultant force generated from two imbalanced components having a fixed, irrational speed ratio is shown. In the depicted example the ratio is √3. The result can be seen in FIG. 17, again showing the magnitude of deflections added for the two components. It is apparent that periodic portions are strongly reduced while a more chaotic vibrational signal is produced. By this, resonances are much less prone to be excited.

As already mentioned it has been found that integer speed ratios of gearbox components should be avoided. The closer a ratio is to an integer, the stronger the quasi-periodic portions of the combined vibration are and therefore it is advantageous to avoid speed ratios within an interval around the integer. The width of the interval can depend on the specific circumstances of a given gearbox and may thus be smaller in one example and wider in another. By avoiding an interval being by definition broader than the precise integer value only, strong reductions in the level of vibrations are possible.

The interval may be Ri+/−3% or Ri+/−7% (or a value in between) to provide an example for a simple description of an efficient selection of the interval. Therein, Ri denotes an integer, in particular an integer of 2 or greater than 2.

With reference to FIG. 18 an optimized definition of intervals I is now described. FIG. 18 shows possible values for the speed ratio R of two components of the gearbox 30, 130, 230 rotating at a constant ratio of speeds. When designing the gearbox 30, 130, 230, the numbers of teeth of each of the gears are chosen. These numbers lead to a corresponding fixed speed ratio R. As soon as the components are rotated, they assume this fixed speed ratio R.

FIG. 18 shows on the x axis the squared speed ratio R, $R^2$, and on the y axis the speed ratio R. The points shown in the diagram correspond to different specific speed ratios R at their corresponding $R^2$ value, so the values on the y axis follow the square root of the x axis value.

Various horizontal lines depict integer speed ratios Ri. The areas between dashed horizontal lines around the integers Ri depict intervals I that are disallowed for gearbox component speed ratios. The areas between these intervals I are allowed ranges for the speed ratios. When designing the gearbox 30, 130, 230 it is assured that at least a certain pair of two components, in particular all possible pairs of rotatable components, have speed ratios within the allowed ranges. This may be done in an iterative procedure and/or by providing a plurality of possible gearbox designs (also referred to as gearbox setups) and selecting the gearbox design with the best speed ratios, e.g., with no speed ratio R within the disallowed intervals I, or with the fewest speed ratios R within the disallowed intervals I.

It has been found that by defining the interval I around at least one, in particular each integer Ri (or each integer Ri adjacent to possible speed ratios R of the gearbox) as $$(\sqrt[2]{(Ri^2-k)}, \sqrt[2]{(Ri^2+k)}),$$

wherein k is an integer, in particular 1, allows to set the edges of the disallowed interval I on an irrational number next to the adjacent integer Ri that provides an effective reduction of vibrations compared to the integer Ri itself and the values inside the interval I. Advantages of the interval I defined as such are a simple calculation and a narrow, but effective definition of allowed and disallowed speed ratios R. This enables a quick design of gearboxes with much freedom for modifications while at the same time ensuring a small level of vibrations.

The interval I around an integer Ri may be asymmetric.

As an example, the gearbox 30; 130; 230 may have a transmission ration (between input and output shafts) between 3 and 4.

FIG. 19 shows a method for manufacturing a gearbox 30; 130; 230 having an input (e.g., shaft 26) and an output (e.g., linkages 36). The method comprises the following steps.

Step S100: Providing a predefined transmission ratio between the input 26 and the output 36.

Step S101: Providing a predefined interval I around an integer Ri larger than 1, e.g., as indicated above. It should be noted that step S101 may also be performed before step S100, after step S102 or after step S103.

Step S102: Providing a gearbox design having the predefined transmission ratio or having a transmission ratio within a predefined range around the predefined transmission ratio. For example, the gearbox design is a planetary gearbox design and comprises a certain number of planets, a certain planet gear tooth number, a certain sun gear tooth number and a certain ring gear tooth number. Further, for providing a gearbox setup, operating conditions of the gearbox in use (e.g., a speed and/or a torque, both internal and/or external) may be taken into account and/or a stiffness of one or more gearbox components may be taken into account. The sun gear may be designed as a floating sun.

Step S103: Determining a speed ratio R of at least two components 28, 32, 34, 38, 0 of the gearbox setup (e.g., a speed ratio two components of a gearbox manufactured in accordance with the gearbox design would have). For this purpose known equations for determining component speeds, e.g., planet carrier speeds and planet speeds may be applied, depending on the specific type of gearbox 30, 130, 230. To provide an example, the speed Sp of a planet gear may be calculated in step 103 based on the speed Sr of the ring gear, the speed Sc of the planet carrier, and the numbers Nr, Np of teeth of the ring and planet gears as follows:

$$Sp=Sr(Nr/Np)+Sc(1-Nr/Np).$$

To provide another example, the oil film speed may be approximated by 0.4 to 0.48 of the corresponding planet gear speed relative to the planet carrier. The carrier speed may be added as a vector to obtain the oil film frequency with respect to a fixed frame (e.g., the fixture F).

Step S104: Comparing the speed ratio R with the predefined interval I around the integer Ri. When the comparison yields that the speed ratio R is outside the predefined interval I (and, optionally, outside of all predefined intervals I around integers or adjacent integers), and optionally, all speed ratios R fulfil this requirement, the method may proceed to step S105. On the other hand, when the comparison yields that at least one speed ratio R is within the disallowed interval I, the method may return to step S102 to provide a different gearbox design (e.g., by changing at least one number of teeth). Alternatively or in addition, it is possible to provide a plurality of different gearbox designs in step S102 and in step S104 select that gearbox design which best fulfils the requirements. As another option, the gearbox design may iteratively be found by converging to a solution where speed ratios R are avoiding integers (and the predefined intervals around the integers) to the maximum extent.

To provide an example, FIG. 22 shows transmission ratios (gear ratio) of the gearbox versus possible sun gear tooth numbers Zs keeping a fixed number of planets and number of teeth for the planet gears. The transmission ratio closest to the predetermined transmission ratio and outside of the predetermined intervals around integers may be selected (diamonds indicate possible choices, triangles indicate upper restricted interval limits using k=1, and squares indicate lower restricted interval limits using k=1). The chosen sun tooth number results in a specific gearbox design with a specific planet tooth number (in FIG. 22: 40) and number of planets (in FIG. 22: 5) and a resulting ring gear tooth number. For all possible pairs of the rotating components including the gears and the movable bearing components the resulting speed ratios are determined and compared with the predefined intervals around the adjacent integers. In particular, inter-shaft bearings may be taken into account as well and/or other adjacent rotating components of an engine with the gearbox.

Turning back to FIG. 19, the method further comprises:

Step S105: Manufacturing a gearbox 30; 130; 230 in accordance with the (selected) gearbox design. This is done in dependence on the comparison. The gearbox 30, 130, 230 may be a power gearbox. For example, the gearbox 30, 130, 230 is adapted to provide the transmission of a geared turbofan, of an open rotor engine, of a helicopter, or of a hybrid aircraft engine.

FIG. 19 further shows a method for monitoring a gearbox 30; 130; 230 manufactured in accordance with steps S100 to S105. The method for monitoring the gearbox 30; 130; 230 comprises:

Step S106: Determining one or more components 28, 32, 34, 38, 0 of the gearbox 30; 130; 230 having the speed ratio R closest to an integer Ri.

Step S107: Monitoring the vibration of the determined component(s) 28, 32, 34, 38, 0 and/or of components that are excited by these components. This allows to focus the monitoring on those components that are by design most prone to create vibrations.

FIG. 20 shows a control system 102 for a gas turbine engine 10 for monitoring hunting tooth frequencies (HTF). Hunting tooth frequency occurs when the same tooth an each gear comes into mesh a second time. For gears mounted on parallel shafts, the HTF can be determined by dividing the least common multiple of the teeth on the two gears by the uncommon factor of the gear on interest. The product equals the number of revolutions the gear must make before the HTF occurs.

The control system 102 of FIG. 20 is adapted to calculate hunting tooth frequencies of at least one component of the gearbox 30; 130; 230, e.g., of the sun gear and/or of a planet gear (or, optionally, for every possible pair of components of the gearbox).

Therein, an analyzer 73 receives measured values from speed sensors 56-58 measuring speeds of shafts of the gas turbine engine, from one or more torque meters 59 measuring shaft torques, from one or more vibration sensors 64, e.g., XYZ-sensors, measuring vibrations at the gearbox and/or at other locations of the gas turbine engine, engine power from an engine power measurement block 79 and/or gearbox power from a gearbox power measurement block 80.

The analyzer 73 comprises a frequency-domain analysis block 74, a time-domain analysis block 75, an angular-domain analysis block 76 and/or a phase analysis block 77. The analyzer 73 determines the speeds of the rotatable gearbox components based on the received measured values and using one or more of the analysis blocks 74-77. Furthermore, the analyzer 73 calculates hunting tooth frequencies of gears of the gearbox.

The calculated hunting tooth frequencies (and, optionally, also the determined speeds and/or further values) are provided to a trend analysis block 83, in particular together with baseline conditions (in particular for shaft speeds, torques, vibrations and/or power control parameters, e.g., for fuel flow and variable guide vane position). Based on these inputs, the trend analysis block 83 determines whether or not there is a trend in changing amplitudes of the hunting frequencies, e.g., by means of monitoring time histories and/or a sideband analysis.

When no trend is found, a life estimator 81 is invoked so as to count hunting recurrences. This is stored in a data storage 82. Optionally, also the analyzer 73 is fed back with this information.

When, on the other hand, a trend is found, this event is stored at the data storage 82 and further provided to a signaling block 84. The signaling block 84 may provide a signal to activate an inspection, maintenance and/or to follow certain prescriptions.

With reference to FIG. 21 it is now described how potential residual frequencies may be processed, e.g. when monitoring an engine such as gas turbine engine 10. The control system 102 described above may comprise some or all of the blocks 85-89 shown in FIG. 21. Alternatively or in addition, a method to monitor a gearbox may comprise some or all of the blocks 85-89 shown in FIG. 21 as corresponding method steps.

At block 85, at least one speed ratio of a pair of rotating components of the gearbox, in particular speed ratios of any possible combination of pairs of rotating components of the gearbox, is/are determined. This may be done when designing the gearbox as described further above.

At block 86, it is determined whether or not at least one pair of rotating components of the gearbox has a speed ratio that is within a restricted interval around an integer (e.g., as defined above). When this is not the case, "no" in FIG. 21, it is proceeded to block 87.

At block 87, a default monitoring system and/or method is invoked. This may include observing vibrational sensor measurements and maximum vibrations.

If, however, it is determined at block 86 that at least one pair of rotating components of the gearbox has a speed ratio that is within a restricted interval around an integer (e.g., has a fixed speed ratio of 4.10), it is proceeded at block 88.

At block 88, one or more of the following residual frequency calculations are performed: (i) Hunting frequencies are determined as described above; and/or (ii) a difference of the respective speed ratio to the next integer is determined (e.g., residual orders may be evaluated); and/or (iii) sidebands may be determined, e.g., using the formulas given below:

$$R = \frac{\omega_j}{\omega_w}$$

wherein $\omega_j$; $\omega_w$ [Hz] correspond to first engine orders;

$$h \cdot \omega_j; z \cdot \omega_j$$

wherein h, z [Hz] are multiples of 1st engine orders, h, z$\in$ $\mathbb{N}$, $\mathbb{Z}$; and the sidebands are calculated using:

$$p(h \cdot R\omega_w) +/- q\left(z \cdot \frac{\omega_j}{R}\right)$$

Wherein p, q$\in \mathbb{N}$.

From block 88, it is proceeded to block 89.

At block 89, one or of the following actions may be performed (by the system and/or method): (i) the determined residual frequencies may be monitored, e.g. with a precision higher than of the monitoring of other frequencies; and/or (ii) a life consumption of one or more components, in particular of the gearbox may be determined (based thereon, maintenance procedures may be activated); and/or (iii) critical frequencies may be identified to be filtered out from an engine controller loop.

As an example, the control system 2 of FIG. 7 (or another control system) may be provided with parameters (e.g., the critical frequencies described in action (iii)) that are determined based on the identification of one or more speed ratios of components of a gearbox that are within a predetermined interval around an integer. By this it is possible to actively avoid (remaining) resonances when controlling the engine (or other apparatus), in particular shaft speeds, based on the design of the given gearbox. To this end, active feedback may be provided to the controller.

FIG. 23 shows an aircraft 8 in the form of a passenger aircraft. Aircraft 8 comprises several (i.e., two) gas turbine engines 10 in accordance with FIGS. 8 to 10.

It is further worth mentioning that it has been found that integer speed ratios are known to generate low frequency modulations that are prone to interfere with engine control systems (fuel, oil, variable vanes, variable nozzles, speed, torque etc.). For a gas turbine engine 10 the integer speed ratio avoidance may thus be specifically effective.

Reducing the level of vibrations may increase the lifetime of components and allow to increase maintenance intervals. Further, noise and wear may be reduced.

The control system and method described herein may actively avoid that two or more shafts of an apparatus run at speeds with integer multiples on one another while maintaining the performance of the apparatus at a given target and, optionally, minimized fuel consumption. The control system and method described herein may actively determine shaft speed ratios and control the rotation of at least one of the shafts based thereon, and/or determine another parameter (e.g. operational status), apply a database that is constructed based on shaft speed ratios and the other parameter, and control the rotation of at least one of the shafts based on the other parameter.

It is worth noting that the speed ratios determined by design in the gearbox may be very different from the speed ratios obtained with the high pressure shaft in the engine (e.g., the gearbox transmission ratio may be 3.5=N2/N1, fixed by design, and N3/N1 may be equal to 20).

In the following, further examples are described:

Example 1: A method for controlling an apparatus having at least a first shaft 26, 27 and a second shaft 27, 54 that are rotatable with a variable ratio of speeds, the method comprising controlling rotation S3; S13, S14 of at least one of the shafts 26, 27, 54 depending on a speed ratio R of speeds of the shafts 26, 27, 54.

Example 2: The method according to example 1, wherein controlling rotation S3 of the at least one of the shafts 26, 27, 54 depending on the speed ratio R comprises restricting the rotation of the shafts 26, 27, 54 to predetermined speed ratios.

Example 3: The method according to example 1 or 2, wherein controlling rotation S3 of the at least one of the shafts 26, 27, 54 depending on the speed ratio R is performed so as to avoid an integer ratio of speeds of the shafts 26, 27, 54.

Example 4: The method according to any of examples 1-3, further comprising determining S1 a speed of the first shaft 26, 27 and a speed of the second shaft 27, 54.

Example 5: The method according to example 4, further comprising calculating S2 a speed ratio R of the determined speeds of the first and second shafts 26, 27, 54, wherein controlling rotation S3 of the at least one of the shafts 26, 27, 54 is performed depending on the calculated speed ratio R.

Example 6: The method according to example 5, further comprising determining whether or not the calculated speed ratio R is within a predetermined interval around an integer.

Example 7: The method according to any of examples 1-6, wherein controlling rotation S3 of the at least one of the shafts 26, 27, 54 comprises controlling at least one of the shafts 26, 27, 54 so as to increase or decrease its speed.

Example 8: The method according to example 7, wherein controlling at least one of the shafts 26, 27, 54 so as to increase or decrease its speed is performed by moving S13 a variable device of the apparatus 1; 10.

Example 9: The method according to example 8, wherein the apparatus is a gas turbine 10 and the variable device comprises at least one variable stator vane 41.

Example 10: The method according to any of examples 7 to 9, wherein the apparatus 1; 10 is an engine and controlling rotation S3 of at least one of the shafts 26, 27, 54 comprises incrementing or decrementing S14 a power setting of the engine.

Example 11: The method according to any of examples 1-10, further comprising determining a level of vibrations at the apparatus 1; 10 and comparing the level of vibrations with a predetermined threshold, wherein controlling rotation S3 of at least one of the shafts 26, 27, 54 depending on a speed ratio R of speeds of the shafts 26, 27, 54 is performed when the level of vibrations exceeds the predetermined threshold.

Example 12: The method according to any of examples 1 to 11, further comprising providing a database 72 storing a plurality of possible operational statuses of the apparatus 1; 10 and appropriate speeds of the shafts 26, 27, 54 for each operational status having no integer ratio; and controlling the apparatus 1; 10 using the database 72.

Example 13: The method according to example 12, wherein the database 72 comprises at least one series of possible successive operational statuses and appropriate speeds of the shafts 26, 27, 54 for each operational status having no integer ratio.

Example 14: A control system 2 for controlling an apparatus having at least a first and a second shaft that are rotatable with a variable ratio of speeds, the control system 2 being adapted to perform the method according to any of examples 1-13.

Example 15: The control system 2 according to example 14, further comprising a near-integer-speed-ratio detector 62 for detecting a ratio of speeds at or near to an integer and/or further comprising a database 72 storing a plurality of possible operational statuses of the apparatus 1; 10 and appropriate speeds of the shafts 26, 27, 54 for each operational status having no substantially integer ratio.

Example 16: An apparatus 1; 10 comprising at least two shafts 26, 27, 54 and the control system 2 according to any of examples 14 or 15, optionally further comprising a first speed sensor 56, 57 for determining the speed of the first shaft 26, 27 and a second speed sensor 57, 58 for determining the speed of the second shaft 27, 54.

Example 17: A gas turbine engine 10 for an aircraft comprising: an engine core 11 comprising a turbine 19, a compressor 14, and a core shaft 26 connecting the turbine to the compressor; a fan 23 located upstream of the engine core, the fan comprising a plurality of fan blades; a gearbox 30 that receives an input from the core shaft 26 and outputs drive to the fan 23 so as to drive the fan 23 at a lower rotational speed than the core shaft 26; and a control system 2 according to any of examples 14 or 15, wherein, optionally:

the turbine is a first turbine 19, the compressor is a first compressor 14, and the core shaft is a first core shaft 26; the engine core 11 further comprises a second turbine 17, a second compressor 15, and a second core shaft 27 connecting the second turbine to the second compressor; and the second turbine, second compressor, and second core shaft are arranged to rotate at a higher rotational speed than the first core shaft.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example it is worth noting that the control system 2 and method described herein are applicable not only in gas turbine engines but also, e.g., in multi-shaft industrial power plants, rigs or other multi-shaft machinery, e.g., electrical motors or hybrid engines.

LIST OF REFERENCE NUMBERS 1 apparatus
2, 102 control system
8 airplane
9 principal rotational axis
10 gas turbine engine
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct
23 propulsive fan
24 stationary support structure
26 shaft (input)
27 interconnecting shaft
28 sun gear
30, 130, 230 gearbox
32 planet gears
34 planet carrier
36 linkages (output)
38 ring gear
40 linkages
41 variable stator vane
48 roller-bearing cage
50 intershaft bearing
51 damping
52 bearing
53 bearing
54 shaft
55 bearing
56-58 speed sensor
59 torque meter
61 calculator
62 near-integer-speed-ratio detector
63 state detector
64 vibration sensor(s)
65 analyzer
66 storage
67 resonance detector
68 counter
69 data storage
70 integer-speed avoidance system
71 engine controller
72 database
73 analyzer
74-77 analysis block
78 baseline storage
79 engine power measurement block
80 gearbox power measurement block
81 life estimator
82 data storage
83 trend analysis block
84 signaling block
A core airflow
B bypass airflow
C1, C2 carrier roller bearing
F fixture
I interval
O oil film
P planet journal bearing
R speed ratio
Ri integer
S1, S2 sun roller bearing

The invention claimed is:

1. A method for manufacturing a gearbox, the method comprising:
   providing a predefined interval around an integer Ri;
   providing a gearbox setup;
   determining a speed ratio R of at least two components of the gearbox setup;
   comparing the speed ratio R with the predefined interval around the integer Ri, where Ri=2, 3, 4, 5 or 6; and
   manufacturing a gearbox in accordance with the gearbox setup in dependence on the comparison as follows:
     comparing the speed ratio R with the predefined interval around the integer Ri comprises determining whether or not the speed ratio R is within the predefined interval around the integer Ri; and
     manufacturing the gearbox in accordance with the gearbox setup only when the speed ratio R is not within:
       the predefined interval around the integer Ri;
       the predefined interval around the integer Ri−1;
       the predefined interval around the integer Ri+1.

2. The method according to claim 1, wherein the interval around the integer Ri is defined as $$\left(\sqrt[2]{(Ri^2 - k)}, \sqrt[2]{(Ri^2 + k)}\right),$$

wherein k is an integer and k equals 1 where Ri equals 2, 3 or 4, and k equals 2 where Ri equals 5 or 6.

3. The method according to claim 1, wherein one of the at least two components of the gearbox setup is rotatable with respect to a fixture at a first speed and the other one of the at least two components is rotatable with respect to the fixture at a second speed, wherein the speed ratio R of the two components is a ratio of the first and the second speeds.

4. The method according to claim 1, wherein the speed ratio R is determined for a plurality of pairs of the at least two components of the gearbox setup.

5. The method according to claim 1, wherein the at least two components of the gearbox setup comprise one or more gears having a prime number of teeth.

6. The method according to claim 1, wherein the at least two components of the gearbox setup comprise a carrier for a gear, a roller-bearing cage and/or an oil film of a bearing.

7. The method according to claim 1, wherein the gearbox is a planetary gearbox of a gas turbine engine.

8. The method according to claim 1, wherein:
a plurality of different gearbox setups with a predefined transmission ratio or with a transmission ratio within the predefined range around the predefined transmission ratio are provided;
for each of the plurality of gearbox setups the speed ratio R of the at least two components of the respective gearbox setups is determined;
the determined speed ratios R are compared with the predefined interval around the integer Ri; and
one of the plurality of gearbox setups is selected for manufacturing the gearbox based on the comparison of the determined speed ratios R with the predefined interval around the integer,
wherein the different gearbox setups differ in the number of teeth of at least one component.

9. The method according to claim 1, further adapted for monitoring the gearbox, comprising determining one or more of the at least two components of the gearbox having the speed ratio R closest to an integer Ri, and monitoring the vibration of the determined component(s).

10. A method for controlling an apparatus of a gas turbine having at least a first shaft and a second shaft that are rotatable, the method comprising:
controlling rotation of at least one chosen from the first and second shafts depending on a speed ratio of speeds, wherein controlling rotation of the at least one chosen from the first and second shafts depending on the speed ratio is performed so as to avoid an integer ratio of speeds of the first and second shafts;
determining a level of vibrations at the apparatus and comparing the level of vibrations with a predetermined threshold, wherein controlling rotation of at least one of the shafts depending on a speed ratio R of speeds of the shafts is performed when the level of vibrations exceeds the predetermined threshold.

11. The method according to claim 10, wherein controlling rotation of the at least one of the shafts depending on the speed ratio is performed so as to avoid speed ratios R within an interval around an integer Ri, where Ri=2, 3, 4, 5 or 6, the interval being defined as $$\sqrt[2]{(Ri^2+k)} < R < \sqrt[2]{((Ri+1)^2-k)},$$

wherein k is an integer and k equals 1 where Ri equals 2, 3 or 4, and k equals 2 where Ri equals 5 or 6.

12. The method according to claim 10, wherein controlling rotation of the at least one chosen from the first and second shafts depending on the speed ratio R comprises restricting the rotation of the first and second shafts to predetermined speed ratios.

13. The method according to claim 10, further comprising:
determining a speed of the first shaft and a speed of the second shaft;
calculating the speed ratio R of the determined speeds of the first and second shafts, wherein controlling rotation of the at least one of the shafts is performed depending on the calculated speed ratio; and
determining whether or not the calculated speed ratio R is within a predetermined interval around an integer.

14. The method according to claim 10, wherein controlling rotation of at least one of the shafts comprises controlling the at least one chosen from the first and second shafts so as to increase or decrease the speed thereof, wherein controlling the at least one chosen from the first and second shafts so as to increase or decrease the speed thereof is performed by moving a variable device of the apparatus, wherein the variable device comprises at least one variable stator vane, and wherein controlling rotation of the at least one chosen from the first and second shafts comprises incrementing or decrementing a power setting.

15. An apparatus for a gas turbine comprising:
at least a first shaft and a second shaft that are rotatable with a variable ratio of speeds;
a control system, the control system being adapted to control rotation of at least one chosen from the first and second shafts depending on a speed ratio of speeds, wherein controlling rotation of the at least one chosen from the first and second shafts depending on the speed ratio is performed so as to avoid an integer ratio of speeds of the first and second shafts;
providing a database storing a plurality of possible operational statuses of the apparatus and appropriate speeds of the first and second shafts for each operational status having no integer ratio; and
controlling the apparatus using the database, wherein the database comprises at least one series of possible successive operational statuses and appropriate speeds of the first and second shafts for each operational status having no integer ratio.

16. The apparatus according to claim 15, and further comprising:
a first speed sensor for determining the speed of the first shaft and a second speed sensor for determining the speed of the second shaft, wherein the control system further comprises a near-integer-speed-ratio detector for detecting the ratio of speeds at or near to an integer, where the integer=2, 3, 4, 5 or 6, and a database storing a plurality of possible operational statuses of the apparatus and appropriate speeds of the first and second shafts for each operational status having no substantially integer ratio.

* * * * *